US010139946B2

(12) United States Patent
Nakanishi et al.

(10) Patent No.: US 10,139,946 B2
(45) Date of Patent: Nov. 27, 2018

(54) INPUT DEVICE AND DISPLAY DEVICE

(71) Applicant: Japan Display Inc., Tokyo (JP)

(72) Inventors: Takayuki Nakanishi, Tokyo (JP); Tatsuya Yata, Tokyo (JP); Masaya Tamaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 55 days.

(21) Appl. No.: 15/142,325

(22) Filed: Apr. 29, 2016

(65) Prior Publication Data

US 2016/0320903 A1    Nov. 3, 2016

(30) Foreign Application Priority Data

May 1, 2015    (JP) ................................. 2015-094202

(51) Int. Cl.
*G06F 3/041* (2006.01)
*G06F 3/044* (2006.01)
*G09G 3/36* (2006.01)

(52) U.S. Cl.
CPC ............ *G06F 3/0416* (2013.01); *G06F 3/044* (2013.01); *G06F 3/0412* (2013.01); *G06F 2203/04103* (2013.01); *G06F 2203/04111* (2013.01); *G09G 3/3607* (2013.01); *G09G 3/3648* (2013.01)

(58) Field of Classification Search
CPC ...... G06F 3/0416; G06F 3/0412; G06F 3/044; G06F 2203/04103; G06F 2203/04111; G09G 3/3607; G09G 3/3648
USPC ........................................................ 345/173
See application file for complete search history.

(56) References Cited

U.S. PATENT DOCUMENTS

| 6,365,911 B1 * | 4/2002 | Furuyama .............. B82Y 20/00 257/104 |
| 2006/0132671 A1 | 6/2006 | Koma |
| 2010/0214245 A1 | 8/2010 | Hirota |

(Continued)

FOREIGN PATENT DOCUMENTS

| CN | 103842947 | 6/2014 |
| JP | 2006154402 | 6/2006 |
| JP | 2010198415 | 9/2010 |

OTHER PUBLICATIONS

Chinese Office Action dated May 25, 2018 in corresponding Chinese Application No. 201610265963.3.

*Primary Examiner* — Nicholas Lee
*Assistant Examiner* — Ngan T Pham Lu
(74) *Attorney, Agent, or Firm* — K&L Gates LLP

(57) ABSTRACT

An input device includes a first substrate, a light-emitting element unit, and third conductive layers. The first substrate includes first and second surfaces. The light-emitting element unit includes: first conductive layers formed in one layer on the second surface side; second conductive layers formed in one layer on the second surface side different from the layer of the first conductive layers; and a luminescent layer provided between the first and the second conductive layers and electrically in contact therewith. The third conductive layers are formed to be insulated from the first and the second conductive layers and not to intersect with the second conductive layers in planar view, and are configured to detect a change in an electric field between the first and the third conductive layers depending on coordinates of a proximity object at a position overlapping with the first conductive layers and the first surface in planar view.

18 Claims, 23 Drawing Sheets

(56) References Cited

U.S. PATENT DOCUMENTS

2010/0302202 A1* 12/2010 Takeuchi ............. G06F 3/0412
  345/174
2015/0084006 A1    3/2015 Ivanov
2016/0170512 A1*  6/2016 Park .................. G06F 3/044
  345/173
2016/0188082 A1*  6/2016 Ham ................... G06F 3/0416
  345/174

* cited by examiner

INPUT DEVICE AND DISPLAY DEVICE

CROSS-REFERENCE TO RELATED APPLICATIONS

This application claims priority from Japanese Application No. 2015-094202, filed on May 1, 2015, the contents of which are incorporated by reference herein in its entirety.

BACKGROUND

1. Technical Field

The present invention relates to an input device and a display device that can detect an external proximity object, and in particular to the input device and the display device that can detect an external proximity object approaching from the outside based on a change in capacitance.

2. Description of the Related Art

Japanese Patent Application Laid-open Publication No. 2010-198415 (JP-A-2010-198415) discloses an input apparatus in which an input device, or so-called a touch panel, and a lighting device, or so-called a front light, are integrated with each other.

The input apparatus described in JP-A-2010-198415 includes a light-transmissible substrate capable of transmitting light therethrough and arranged at the border between the touch panel and the front light in a manner shared by them. This configuration reduces the thickness of the input apparatus. In recent years, such input apparatuses have been required to have a further reduced thickness.

SUMMARY

According to an aspect, an input device includes a first substrate, a light-emitting element unit, and third conductive layers. The first substrate includes first and second surfaces. The light-emitting element unit includes: first conductive layers formed in one layer on the second surface side; second conductive layers formed in one layer on the second surface side different from the layer in which the first conductive layers are formed; and at least one luminescent layer provided between the first and the second conductive layers and electrically in contact therewith. The third conductive layers are formed so as to be insulated from the first and the second conductive layers and not to intersect with the second conductive layers in planar view, and are configured to detect a change in an electric field between the first and the third conductive layers depending on the coordinates of a proximity object present at a position overlapping with the first conductive layers and the first surface in planar view.

According to another aspect, a display device comprising: an input device that comprises: a first substrate including a first surface and a second surface; a light-emitting element unit including: a plurality of first conductive layers formed in one layer on the second surface side; a plurality of second conductive layers formed in one layer on the second surface side different from the layer in which the first conductive layers are formed; and at least one luminescent layer provided between the first conductive layers and the second conductive layers and electrically in contact with the first conductive layers and the second conductive layers; and a plurality of third conductive layers that are formed so as to be insulated from the first conductive layers and the second conductive layers and not to intersect with the second conductive layers in planar view, and are configured to detect a change in an electric field between the first conductive layers and the third conductive layers depending on coordinates of a proximity object present at a position overlapping with the first conductive layers and the first surface in planar view; and a display unit provided on the second surface side of the input device and capable of displaying an image on the first surface side.

BRIEF DESCRIPTION OF THE DRAWINGS

FIG. 15 is a diagram for explaining voltages applied to the first conductive layer and the second conductive layer in the drive electrode selection period in a state where the light-emitting element unit is turned on;

FIG. 16 is a diagram for explaining the scanning state in proximity detection in the state where the light-emitting element unit is turned on;

FIG. 19 is a diagram for explaining voltages applied to the first conductive layer and the second conductive layer in the drive electrode selection period in a state where the light-emitting element unit is turned on;

FIG. 20 is a diagram for explaining the scanning state in proximity detection in the state where the light-emitting element unit is turned on;

FIG. 33 is a diagram for explaining voltages applied to the first conductive layer and the second conductive layer in the drive electrode selection period in a state where the light-emitting element unit is turned on;

DETAILED DESCRIPTION

Figure 1:
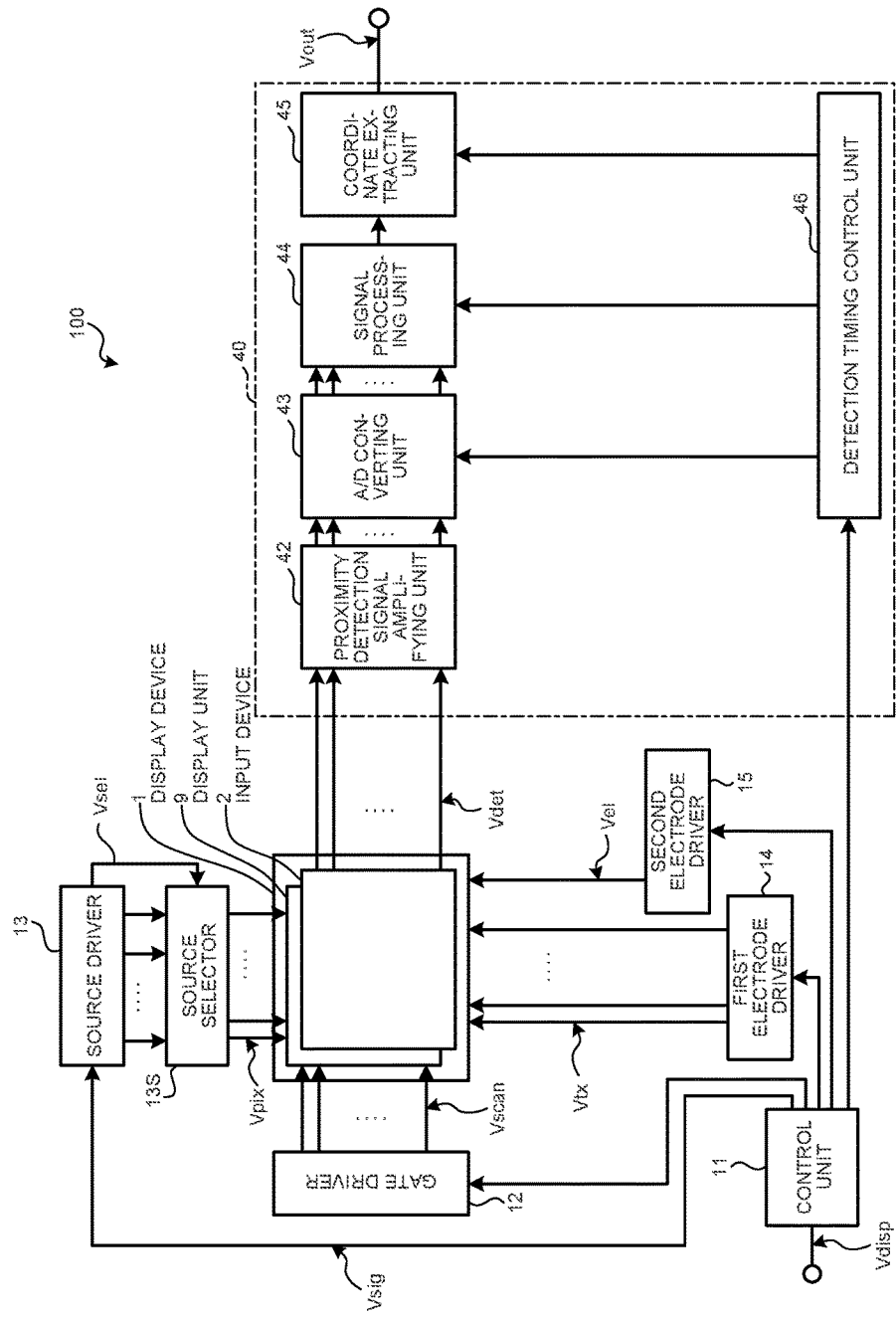
FIG. 1 is a block diagram for explaining a configuration of a display device according to a first embodiment of the present invention.

Exemplary aspects (embodiments) according to the present invention are described below in greater detail with reference to the accompanying drawings. The contents described in the embodiments are not intended to limit the present invention. Components described below include components easily conceivable by those skilled in the art and components substantially identical therewith. Furthermore, the components described below can be appropriately combined. The disclosure is given by way of example only, and various changes made without departing from the spirit of the invention and easily conceivable by those skilled in the art naturally fall within the scope of the invention. The drawings may possibly illustrate the width, the thickness, the shape, and other elements of each unit more schematically than the actual aspect to simplify the explanation. These elements, however, are given by way of example only and are not intended to limit interpretation of the invention. In the specification and the figures, components similar to those previously described with reference to a preceding figure are denoted by like reference numerals, and overlapping explanation thereof will be appropriately omitted.

First Embodiment

FIG. 1 is a block diagram for explaining a configuration of a display device according to a first embodiment of the present invention. A display system 100 includes a display device 1 with a proximity detecting function, a control unit 11, a gate driver 12, a source driver 13, a source selector 13S, a first electrode driver 14, a second electrode driver 15, and a proximity detecting unit 40. In the display device 1 with a proximity detecting function, a reflective display unit 9 and an input device 2 are stacked in a manner overlapping with each other in planar view, which will be described below. The display unit 9 serves as a reflective liquid-crystal display unit, and the input device 2 serves as a capacitive touch panel.

The display unit 9 sequentially scans each horizontal line based on a scanning signal Vscan supplied from the gate driver 12, thereby performing display, which will be described below. The control unit 11 is a circuit that supplies control signals to the gate driver 12, the source driver 13, the first electrode driver 14, the second electrode driver 15, and the proximity detecting unit 40 based on video signals Vdisp supplied from the outside, thereby performing control such that these components operate in synchronization with one another. A control device according to the present invention includes the control unit 11, the gate driver 12, the source driver 13, the first electrode driver 14, the second electrode driver 15, and the proximity detecting unit 40.

The gate driver 12 has a function to sequentially select one horizontal line to be a target of display drive in the display unit 9 based on the control signal supplied from the control unit 11.

The source driver 13 is a circuit that supplies pixel signals Vpix to pixels (sub-pixels) arranged in a matrix on the display surface of the display unit 9 based on the control signal supplied from the control unit 11. The source driver 13 generates an image signal Vsig by time-division multiplexing the pixel signals Vpix for a plurality of sub-pixels in the display unit 9 from the control signal of one horizontal line. The source driver 13 then supplies the image signal Vsig to the source selector 13S. The source driver 13 generates a switch control signal Vsel required to separate the pixel signals Vpix multiplied into the image signal Vsig. The source driver 13 then supplies the switch control signal Vsel to the source selector 13S together with the image signal Vsig. With this configuration, the source selector 13S requires a smaller number of wiring between the source driver 13 and the source selector 13S.

The first electrode driver 14 is a circuit that supplies a drive signal pulse based on a drive signal Vtx to a first conductive layer, which will be described below, of the input device 2 based on the control signal supplied from the control unit 11.

The second electrode driver 15 is a circuit that supplies a drive signal Vel to a second conductive layer, which will be described below, of the input device 2 based on the control signal supplied from the control unit 11.

The proximity detecting unit 40 is a circuit that detects whether a proximity state is created on the input device 2 based on the control signal supplied from the control unit 11 and a proximity detection signal Vdet supplied from the input device 2. If detecting the proximity state, the proximity detecting unit 40 derives the coordinates and the like of the proximity detection area. The proximity detecting unit 40 includes a proximity detection signal amplifying unit 42, an analog/digital (A/D) converting unit 43, a signal processing unit 44, a coordinate extracting unit 45, and a detection timing control unit 46.

The proximity detection signal amplifying unit 42 amplifies the proximity detection signal Vdet supplied from the input device 2. The proximity detection signal amplifying unit 42 may include an analog low-pass filter that removes high-frequency components (noise components) included in the proximity detection signal Vdet and extracts and outputs the component of the proximity detection signal Vdet.

Basic Principle of Capacitive Proximity Detection

Figure 2:
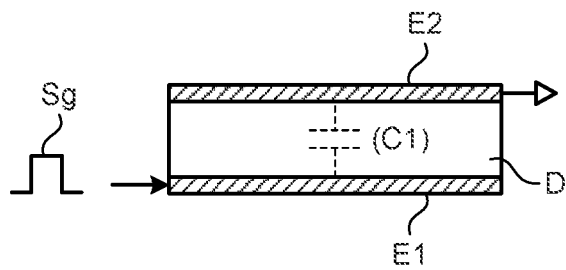
FIG. 2 is a diagram for explaining the basic principle of a capacitive proximity detection technology and illustrates a state where no external proximity object is in contact with or in proximity to an input device.
Figure 3:
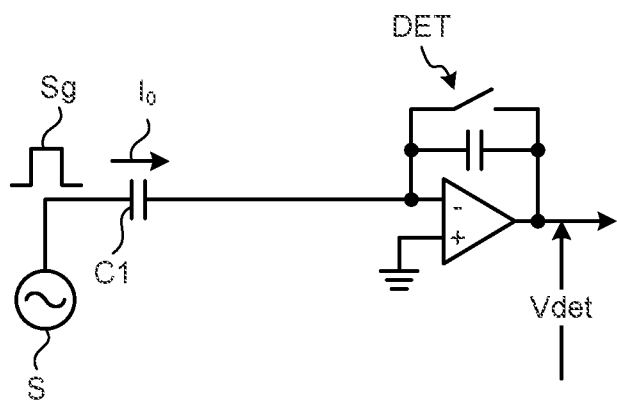
FIG. 3 is a diagram for explaining an example of an equivalent circuit in the state where no external proximity object is in contact with or in proximity to the input device illustrated in FIG. 2.
Figure 4:
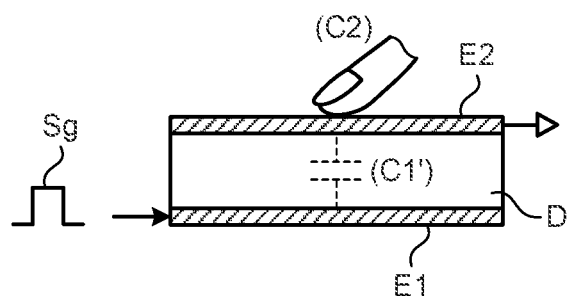
FIG. 4 is a diagram for explaining the basic principle of the capacitive proximity detection technology and illustrates a state where an external proximity object is in contact with or in proximity to the input device.
Figure 5:
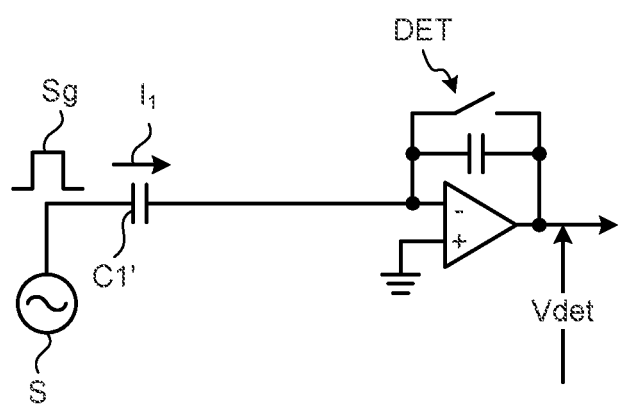
FIG. 5 is a diagram for explaining an example of the equivalent circuit in the state where the external proximity object is in contact with or in proximity to the input device illustrated in FIG. 4.
Figure 6:
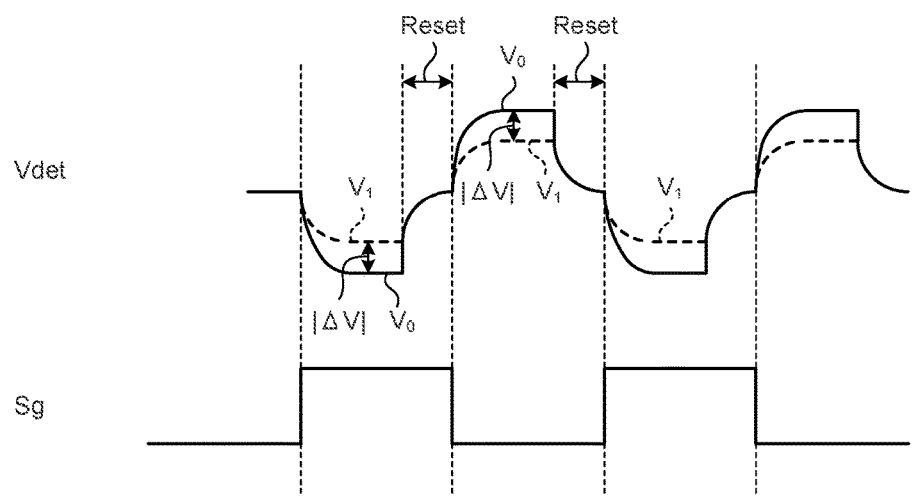
FIG. 6 is a diagram illustrating an example of waveforms of a drive signal and a proximity detection signal.

The input device 2 operates based on the basic principle of capacitive proximity detection and outputs the proximity detection signal Vdet. The following describes the basic principle of proximity detection in the input device 2 with reference to FIGS. 1 to 6. FIG. 2 is a diagram for explaining the basic principle of a capacitive proximity detection technology and illustrates a state where no external proximity object is in contact with or in proximity to the input device 2. FIG. 3 is a diagram for explaining an example of an equivalent circuit in the state where no external proximity object is in contact with or in proximity to the input device 2 illustrated in FIG. 2. FIG. 4 is a diagram for explaining the basic principle of the capacitive proximity detection technology and illustrates a state where an external proximity object is in contact with or in proximity to the input device 2. FIG. 5 is a diagram for explaining an example of the equivalent circuit in the state where the external proximity object is in contact with or in proximity to the input device 2 illustrated in FIG. 4. FIG. 6 is a diagram illustrating an example of waveforms of a drive signal and a proximity detection signal.

As illustrated in FIG. 2, for example, a capacitive element C1 includes a pair of electrodes, i.e., a drive electrode E1 and a proximity detection electrode E2, arranged facing each other with a dielectric D interposed therebetween. As illustrated in FIG. 3, one end of the capacitive element C1 is coupled to an alternating-current (AC) signal source (drive signal source) S, whereas the other end thereof is coupled to a voltage detector (proximity detecting unit) DET. The voltage detector DET is an integration circuit included in the proximity detection signal amplifying unit 42 illustrated in FIG. 1, for example.

When the AC signal source S applies a drive signal pulse Sg, which is an AC rectangular wave, at a predetermined frequency (e.g., several kilohertz to several hundred kilohertz) to the drive electrode E1 (one end of the capacitive element C1), an output waveform (proximity detection signal Vdet) is generated via the voltage detector DET coupled to the proximity detection electrode E2 (the other end of the capacitive element C1).

In a non-proximity state (including a non-contact state) where no external proximity object (e.g., a finger or a stylus pen) is in proximity to (or in contact with) the input device 2, electric current $I_0$ depending on the capacitance value of the capacitive element C1 flows in association with charge and discharge of the capacitive element C1 as illustrated in FIGS. 2 and 3. As illustrated in FIG. 6, the voltage detector DET converts fluctuations in the electric current $I_0$ depending on the drive signal pulse Sg into fluctuations in the voltage (waveform $V_0$ indicated by the solid line).

On the other hand, in a proximity state (including a contact state) where an external proximity object is in proximity to (or in contact with) the input device 2, a capacitance C2 generated by the external proximity object is in contact with or in proximity to the proximity detection electrode E2 as illustrated in FIG. 4. The presence of the capacitance C2 blocks a capacitance of a fringe between the drive electrode E1 and the proximity detection electrode E2, thereby providing a capacitive element C1' having a capacitance value smaller than that of the capacitive element C1. In the equivalent circuit illustrated in FIG. 5, electric current $I_1$ flows through the capacitive element C1'. As illustrated in FIG. 6, the voltage detector DET converts fluctuations in the electric current $I_1$ depending on the drive signal pulse Sg into fluctuations in the voltage (waveform $V_1$ indicated by the dotted line). In this case, the waveform $V_1$ has amplitude smaller than that of the waveform $V_0$. As a result, an absolute value $|\Delta V|$ of the voltage difference between the waveform $V_0$ and the waveform $V_1$ varies depending on the influence of an object, such as the external proximity object, approaching the input device 2 from the outside. To accurately detect the absolute value $|\Delta V|$ of the voltage difference between the waveform $V_0$ and the waveform $V_1$, the voltage detector DET preferably performs the operation with a period Reset to reset charge and discharge of a capacitor based on the frequency of the drive signal pulse Sg by switching in the circuit.

The input device 2 illustrated in FIG. 1 sequentially scans each detection block in response to the drive signal supplied from the first electrode driver 14, thereby performing proximity detection.

The input device 2 outputs the proximity detection signal Vdet for each detection block from a plurality of proximity detection electrodes, which will be described below, via the voltage detector DET illustrated in FIG. 3 or FIG. 5. The input device 2 thus supplies the proximity detection signal Vdet to the proximity detection signal amplifying unit 42 of the proximity detecting unit 40. The proximity detection signal amplifying unit 42 amplifies the proximity detection signal Vdet and supplies it to the A/D converting unit 43.

The A/D converting unit 43 is a circuit that samples an analog signal output from the proximity detection signal amplifying unit 42 at timing synchronized with the drive signal, thereby converting the analog signal into a digital signal.

The signal processing unit 44 includes a digital filter that reduces frequency components (noise components) other than the frequency at which the drive signal is sampled in the output signal from the A/D converting unit 43. The signal processing unit 44 is a logic circuit that detects whether a touch is made on the input device 2 based on the output signal from the A/D converting unit 43. The signal processing unit 44 performs processing for extracting only the voltage difference caused by the external proximity object. The signal of the voltage difference caused by the external proximity object corresponds to the absolute value $|\Delta V|$ of the difference between the waveform $V_0$ and the waveform $V_1$. The signal processing unit 44 may perform an arithmetic operation for averaging the absolute values $|\Delta V|$ per detection block, thereby calculating the average value of the absolute values $|\Delta V|$. The signal processing unit 44 thus can reduce the influence of noise. The signal processing unit 44 compares the signal of the detected voltage difference caused by the external proximity object with a predetermined threshold voltage. If the voltage difference is equal to or larger than the threshold voltage, the signal processing unit 44 determines that the external proximity object is in the proximity state. On the other hand, if the voltage difference is determined to be smaller than the threshold voltage as a result of comparison between the detected digital voltage and the predetermined threshold voltage, the signal processing unit 44 determines that the external proximity object is in the non-proximity state. The proximity detecting unit 40 thus performs proximity detection.

The coordinate extracting unit 45 is a logic circuit that derives, when a proximity state is detected by the signal processing unit 44, the coordinate position at which the proximity state is created in the plane of the detection area. The detection timing control unit 46 performs control such that the A/D converting unit 43, the signal processing unit 44, and the coordinate extracting unit 45 operate in synchronization with one another. The coordinate extracting unit 45 outputs the coordinates of the proximity object as an output signal Vout.

Figure 7:
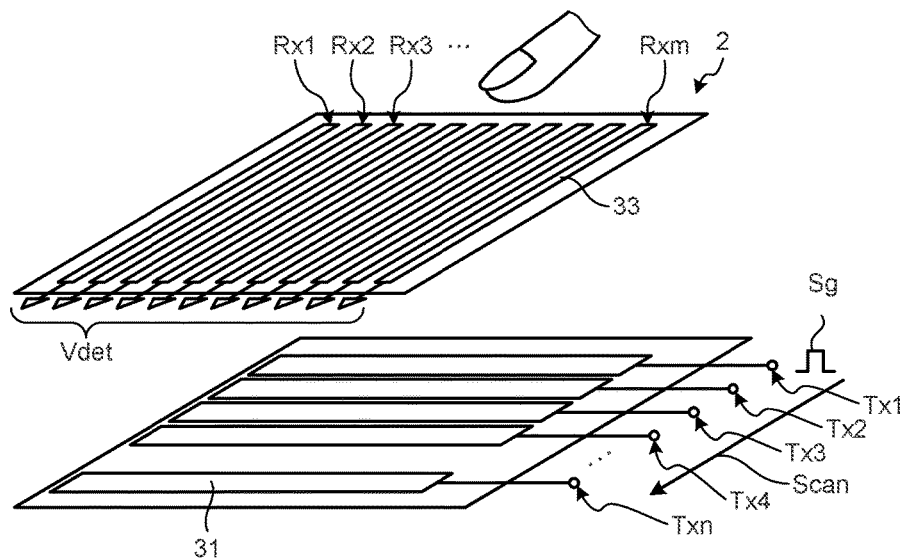
FIG. 7 is a perspective view illustrating an example of drive electrodes and proximity detection electrodes of an input device according to the first embodiment.

FIG. 7 is a perspective view illustrating an example of the drive electrodes and the proximity detection electrodes of the input device according to the first embodiment. The input device 2 includes first conductive layers 31 and third conductive layers 33 insulated from the first conductive layers 31. The first conductive layers 31 have a plurality of stripe electrode patterns extending in a predetermined extending direction of a conductor pattern. The electrode patterns serve as drive electrodes Tx1, Tx2, Tx3, . . . , Txn (hereinafter, which may be referred to as drive electrodes Tx) from which the drive signal pulse Sg is applied. The third conductive layers 33 have a plurality of stripe electrode patterns extending in a direction intersecting with the extending direction of the first conductive layers 31. The electrode patterns serve as proximity detection electrodes Rx1, Rx2, Rx3, . . . , Rxm (hereinafter, which may be referred to as proximity detection electrodes Rx) that output the proximity detection signal Vdet. The electrode patterns of the proximity detection electrodes Rx are coupled to respective input terminals of the proximity detection signal amplifying unit 42 of the proximity detecting unit 40.

In the input device 2 according to the first embodiment illustrated in FIG. 7, the proximity detection electrodes Rx face the drive electrodes Tx. The proximity detection electrodes Rx do not necessarily face the drive electrodes Tx and may be provided in the same layer as that of the drive electrodes Tx. The proximity detection electrodes Rx or the drive electrodes Tx do not necessarily have a stripe shape, i.e., a shape divided into a plurality of portions, and may have a comb shape, for example. Alternatively, any shape can be employed for the proximity detection electrodes Rx or the first conductive layers 31 (drive electrode block), as long as being divided into a plurality of portions. In this case, the shape of the slits dividing the first conductive layers 31 may be a straight line or a curve.

The drive electrode E1 illustrated in FIG. 2 corresponds to each of the drive electrodes Tx illustrated in FIG. 7. The proximity detection electrode E2 illustrated in FIG. 2 corresponds to each of the proximity detection electrodes Rx illustrated in FIG. 7. With this configuration, a capacitance corresponding to the capacitance value of the capacitive element C1 illustrated in FIG. 2 is generated at the intersections at which the drive electrodes Tx intersect with the proximity detection electrodes Rx in planar view illustrated in FIG. 7.

Figure 8:
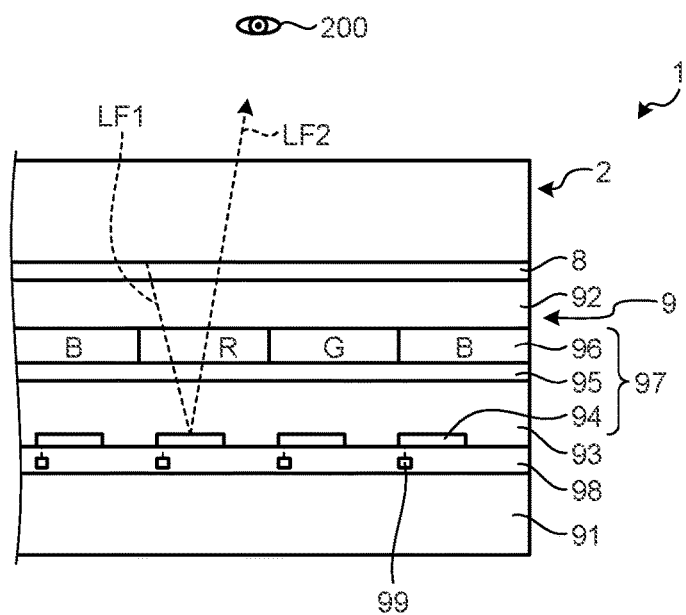
FIG. 8 is a sectional view schematically illustrating the structure of a display device with a proximity detecting function according to the first embodiment.

The following describes the structure of the display device 1 with a proximity detecting function. FIG. 8 is a sectional view schematically illustrating the structure of the display device with a proximity detecting function according to the first embodiment. A display unit 9 according to the first embodiment is a reflective image display panel. The display unit 9 may be a transflective image display panel and simply needs to be a display device that displays an image by reflecting incident light entering from the observer 200 side. As illustrated in FIG. 8, the display unit 9 includes an array substrate 91 and a counter substrate 92 facing each other. A liquid-crystal layer 93 in which liquid-crystal elements are sealed is provided between the array substrate 91 and the counter substrate 92.

The array substrate 91 is a transparent light-transmissive substrate, such as a glass substrate. The array substrate 91 includes a plurality of pixel electrodes 94 on the surface of an insulation layer 98 on the liquid-crystal layer 93 side. The pixel electrodes 94 are coupled to signal lines via respective switching elements 99. The pixel signals Vpix described above are applied to the pixel electrodes 94. The pixel electrodes 94 are made of a material having metallic luster, such as aluminum and silver, and have light reflectivity. With this structure, the pixel electrodes 94 reflect external light or light from the input device 2.

The counter substrate 92 is a transparent light-transmissive substrate, such as a glass substrate. The counter substrate 92 includes a counter electrode 95 and color filters 96 on the surface on the liquid-crystal layer 93 side. More specifically, the counter electrode 95 is provided on the surface of the color filters 96 on the liquid-crystal layer 93 side.

The counter electrode 95 is made of a transparent light-transmissive conductive material, such as indium tin oxide (ITO) and indium zinc oxide (IZO). The counter electrode 95 is supplied with a common potential common to the pixels. When a voltage generated by an image output signal is applied between the pixel electrodes 94 and the counter electrode 95 facing each other, the pixel electrodes 94 and the counter electrode 95 generate an electric field in the liquid-crystal layer 93. The electric filed generated in the liquid-crystal layer 93 causes the liquid-crystal elements to twist and changes the birefringence, thereby adjusting the amount of light from the display unit 9 in each sub-pixel 97. While the display unit 9 is what is called a vertical-electricfield display unit, it may be a lateral-electric-field display unit that generates an electric field in a direction parallel to the display surface.

The color filter 96 of any one of a first color (e.g., red R), a second color (e.g., green G), and a third color (e.g., blue B) is provided to each sub-pixel 97 in a manner correspondingly to the pixel electrode 94. The pixel electrode 94, the counter electrode 95, and the color filter 96 of each color constitute the sub-pixel 97.

The input device 2 can output light toward the display unit 9 in an LF1 direction. The input device 2 is provided above the surface of the counter substrate 92 on the side opposite to the liquid-crystal layer 93. The display unit 9 uses the input device 2 as a front light, which will be described below, and reflects, in an LF2 direction, the light that has entered in the LF1 direction, thereby displaying an image. The pixel electrode 94 reflects, in the LF2 direction, the light that has entered in the LF1 direction from the surface on the observer 200 side (surface on which an image is displayed), for example. The input device 2 is bonded to the counter substrate 92 with an optical adhesive layer 8. The optical adhesive layer 8 is preferably made of a material having a light-scattering function. The light output from the input device 2 in the LF1 direction is scattered by the optical adhesive layer 8. With this configuration, the pixel electrode 94 is likely to be uniformly irradiated with the light from the input device 2. A polarizing plate may be further provided at the position of the optical adhesive layer 8.

Figure 9:
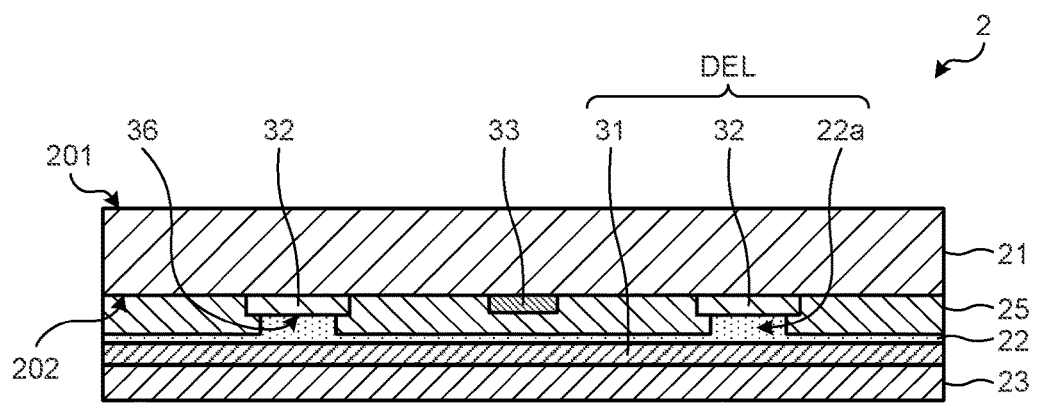
FIG. 9 is a sectional view schematically illustrating the structure of the input device according to the first embodiment.
Figure 10:
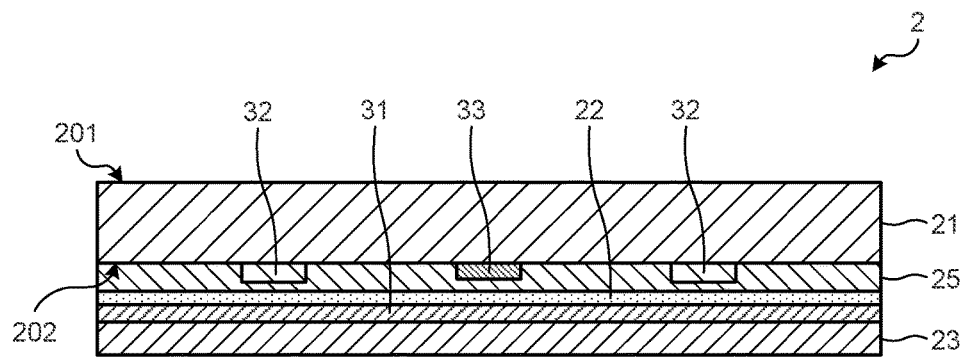
FIG. 10 is another sectional view schematically illustrating the structure of the input device according to the first embodiment.
Figure 11:
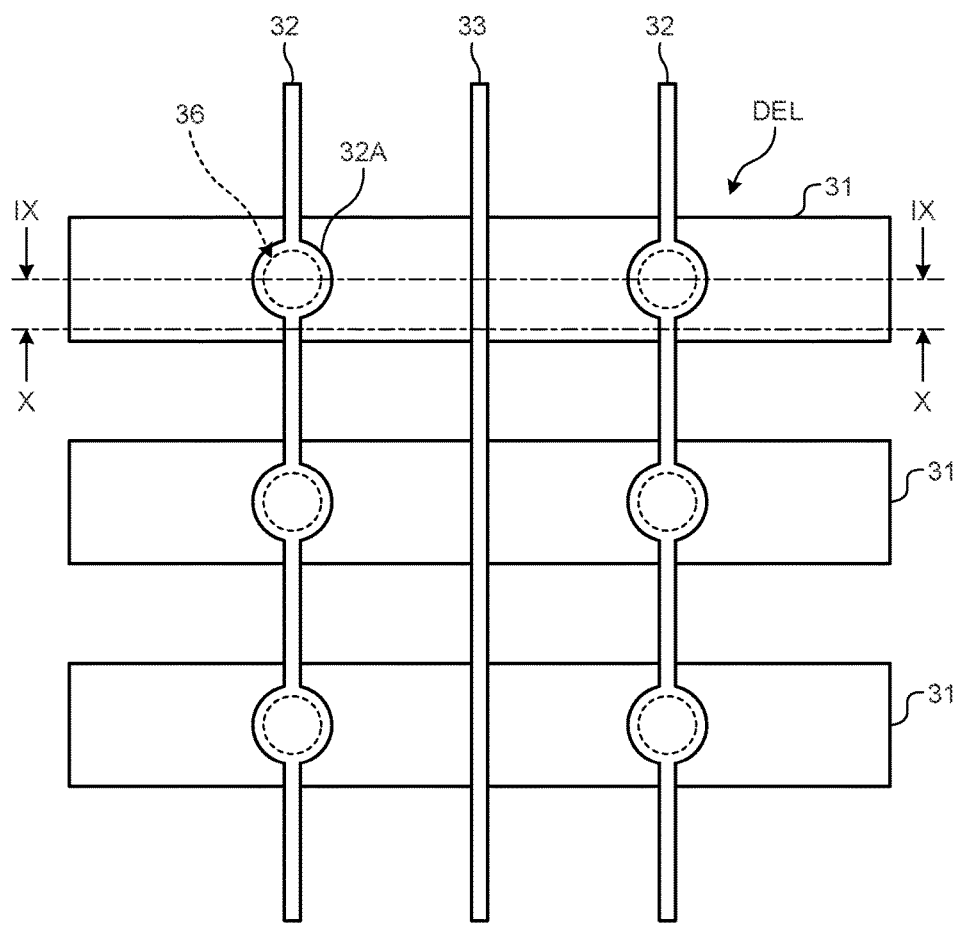
FIG. 11 is a diagram for explaining the positional relation in planar view among first conductive layers, second conductive layers, and third conductive layers of the input device according to the first embodiment.

FIG. 9 is a sectional view schematically illustrating the structure of the input device according to the first embodiment. FIG. 10 is another sectional view schematically illustrating the structure of the input device according to the first embodiment. FIG. 11 is a diagram for explaining the positional relation in planar view among first conductive layers 31, second conductive layers 32, and third conductive layers 33 of the input device according to the first embodiment. The section illustrated in FIG. 9 is a section along line IX-IX in FIG. 11, whereas the section illustrated in FIG. 10 is a section along line X-X in FIG. 11. As illustrated in FIGS. 9, 10, and 11, the input device 2 includes a first substrate 21, the first conductive layers 31, the second conductive layers 32, a luminescent layer 22, and the third conductive layers 33. The first conductive layers 31 are covered with an insulating protective layer 23. The insulating protective layer 23 is not necessarily provided. The first substrate 21 is a light-transmissive substrate, such as a glass substrate, including a first surface 201 and a second surface 202. In the input device 2, the first surface 201 in FIG. 9 is provided on the observer 200 side illustrated in FIG. 8, and the second surface 202 is provided on the display unit 9 side.

As illustrated in FIGS. 9 and 10, the second conductive layers 32 serve as a second electrode and are formed in one layer on the second surface 202 side of the first substrate 21. As illustrated in FIGS. 9 to 11, the second conductive layers 32 have a shape continuously extending in one direction in planar view. The second conductive layers 32 are made of a transparent light-transmissive conductive material, such as ITO and IZO, or a conductive metal material. Examples of the material of the second conductive layers 32 include, but are not limited to, a metal material having metallic luster, such as aluminum (AL), silver (Ag), and chromium (Cr), and an alloy containing these metals. With this structure, the second conductive layers 32 can reflect light emitted from the luminescent layer 22.

As illustrated in FIGS. 9 and 10, the third conductive layers 33 serve as a third electrode and is formed in one layer on the second surface 202 side of the first substrate 21. As illustrated in FIGS. 9 to 11, the third conductive layers 33 have a shape continuously extending in one direction in planar view. An insulation layer 25 is provided between the third conductive layers 33 and the luminescent layer 22. The third conductive layers 33 extend in the same direction as that of the second conductive layers 32 and do not intersect therewith in planar view. The third conductive layers 33, for example, extend in parallel with the second conductive layers 32 in planar view.

The first conductive layers 31 are formed in one layer on the second surface 202 side of the first substrate 21 as the first electrode. The first conductive layers 31 have a shape continuously extending in one direction in planar view and are in contact with the luminescent layer 22 along the shape of the first conductive layers 31. The first conductive layers 31 are made of a transparent light-transmissive conductive material, such as ITO and IZO, or a conductive metal material.

The first conductive layers 31 intersect with the third conductive layers 33 in planar view. The first conductive layers 31 also intersect with the second conductive layers 32 in planar view.

The luminescent layer 22 has a size overlapping with the second conductive layers 32 and the first conductive layers 31 in planar view. The luminescent layer 22, for example, is a flat film having a size covering the second surface 202 in planar view. As illustrated in FIGS. 9 and 10, the luminescent layer 22 is provided between the first conductive layers 31 and the second conductive layers 32. The luminescent layer 22 is electrically in contact with the first conductive layers 31. The luminescent layer 22 contains an organic material and includes a hole injection layer, a hole transport layer, an organic layer, an electron transport layer, and an electron injection layer, which are not illustrated.

Specifically, as illustrated in FIG. 9, the luminescent layer 22 has protrusions 22a protruding toward the second surface 202. The insulation layer 25 is provided between the second conductive layers 32 and the luminescent layer 22. The luminescent layer 22 is electrically in contact with the second conductive layers 32 at the protrusions 22a via contact portions 36. The contact portions 36 are electrically in contact with the second conductive layers 32 at the protrusions 22a. In other words, the first conductive layers 31 are electrically coupled to the second conductive layers 32 via the contact portions 36.

A light-emitting element unit DEL includes one of the first conductive layers 31, one of the protrusions 22a of the luminescent layer 22, and one of the second conductive layers 32. When a forward-bias voltage is applied to the first conductive layer 31 and the second conductive layer 32, the protrusion 22a of the luminescent layer 22 emits light. When the voltage is applied, the light-emitting element unit DEL emits light along the shape of the protrusion 22a of the luminescent layer 22. The input device 2 thus functions as a front light that can output light to the display unit 9 illustrated in FIG. 8. In the description of the embodiments below, a voltage also indicates electric potential.

Assume that the direction in which the first conductive layers 31 extend is a first direction, and the direction in which the second conductive layers 32 extend is a second direction. In this case, first light-blocking portions 32A are formed in the same layer as the layer in which the second conductive layers 32 are formed, and the first light-blocking portions 32A correspond to wide portions of the second conductive layers 32 in which the width of the second conductive layers 32 is broadened in the first direction intersecting with the second direction. The length of the first light-blocking portions 32A in the first direction is larger than the maximum length of the contract portions 36 in the first direction. The first light-blocking portions 32A can cover the respective contact portions 36 viewed in a direction perpendicular to the first surface 201 of the first substrate 21. This structure can decrease the resistance at the contact portions 36, thereby increasing the light emission efficiency of the light-emitting element units DEL.

The first light-blocking portions 32A have a light-blocking property and may be made of any material as long as having the light-blocking property. The first light-blocking portions 32A are preferably made of a metal material having metallic luster, such as Al, Ag, and Cr, and an alloy containing these metals to reflect light emitted from the luminescent layer 22. The first light-blocking portions 32A are preferably made of the same material as that of the second conductive layers 32 for easier fabrication. As described above, the light-emitting element units DEL each include the corresponding first light-blocking portion 32A, thereby suppressing leakage of light toward the first surface 201 of the first substrate 21.

According to the first embodiment, as illustrated in FIGS. 9 and 10, the first surface 201 of the first substrate 21 opposite to the second surface 202 on which the third conductive layers 33 are formed is a reference plane (coordinate input reference plane) serving as a reference for input coordinates of the proximity object.

As described above, the first conductive layers 31 correspond to the drive electrodes Tx from which the drive signal pulse Sg is applied, whereas the third conductive layers 33 correspond to the proximity detection electrodes Rx described above (refer to FIG. 7). When the input device 2 performs a proximity detection operation, the third conductive layers 33 output, to the proximity detecting unit 40 (refer to FIG. 1), a change in the electric field between the first conductive layers 31 and the third conductive layers 33 depending on proximity of the proximity object present at a position overlapping with the first surface 201 of the first substrate 21 in planar view or on the coordinates of the proximity object.

To manufacture the input device 2, the first substrate 21 is prepared, and the second conductive layers 32 and the third conductive layers 33 are simultaneously patterned on the second surface 202 of the first substrate 21. The insulation layer 25 is then formed in a manner covering the second conductive layers 32 and the third conductive layers 33 in the input device 2. A part of the insulation layer 25 is then etched by wet etching or dry etching, for example, to expose the positions corresponding to the respective contact portions 36 on the second conductive layers 32. The luminescent layer 22 is then formed in a manner covering the surface of the insulation layer 25 and the contact portions 36. The first conductive layers 31 are then patterned on the surface of the luminescent layer 22 in the input device 2. The protective layer 23 containing a light-transmissive insulator, such as alumina ($Al_2O_3$), is then formed in the input device 2.

As described above, the second conductive layers 32 and the third conductive layers 33 are simultaneously formed in the input device 2 according to the first embodiment. As a result, the input device 2 can be manufactured at a lower cost. Because the second conductive layers 32 and the third conductive layers 33 are formed at the same level, the input device 2 has a smaller thickness as a whole.

Drive Control

The following describes drive control performed by the input device 2 according to the first embodiment with reference to FIGS. 1, 7, and 12 to 20. When the input device 2 performs a proximity detection operation, the first electrode driver 14 illustrated in FIG. 1 performs driving to sequentially and time-divisionally scan the drive electrodes Tx illustrated in FIG. 7. As a result, a part of the first conductive layers 31 (drive electrodes Tx) is sequentially selected in a scanning direction Scan. The input device 2 then outputs the proximity detection signals Vdet from the proximity detection electrodes Rx. The first electrode driver 14 may perform driving to sequentially and time-divisionally scan detection blocks each including a plurality of drive electrodes Tx illustrated in FIG. 7 in the input device 2.

The first conductive layers 31 serve not only as electrodes of the light-emitting element units DEL but also as the drive electrodes Tx of the input device 2. Therefore, even if not necessary, the light-emitting element units DEL may emit light by the drive signal pulse Sg being applied to the first conductive layers 31 (drive electrodes Tx). To address this, the input device 2 according to the first embodiment employs a driving method for suppressing unintended emission of light from the light-emitting element units DEL even when the drive signal pulse Sg is applied to the first conductive layers 31 (drive electrodes Tx).

Figure 12:
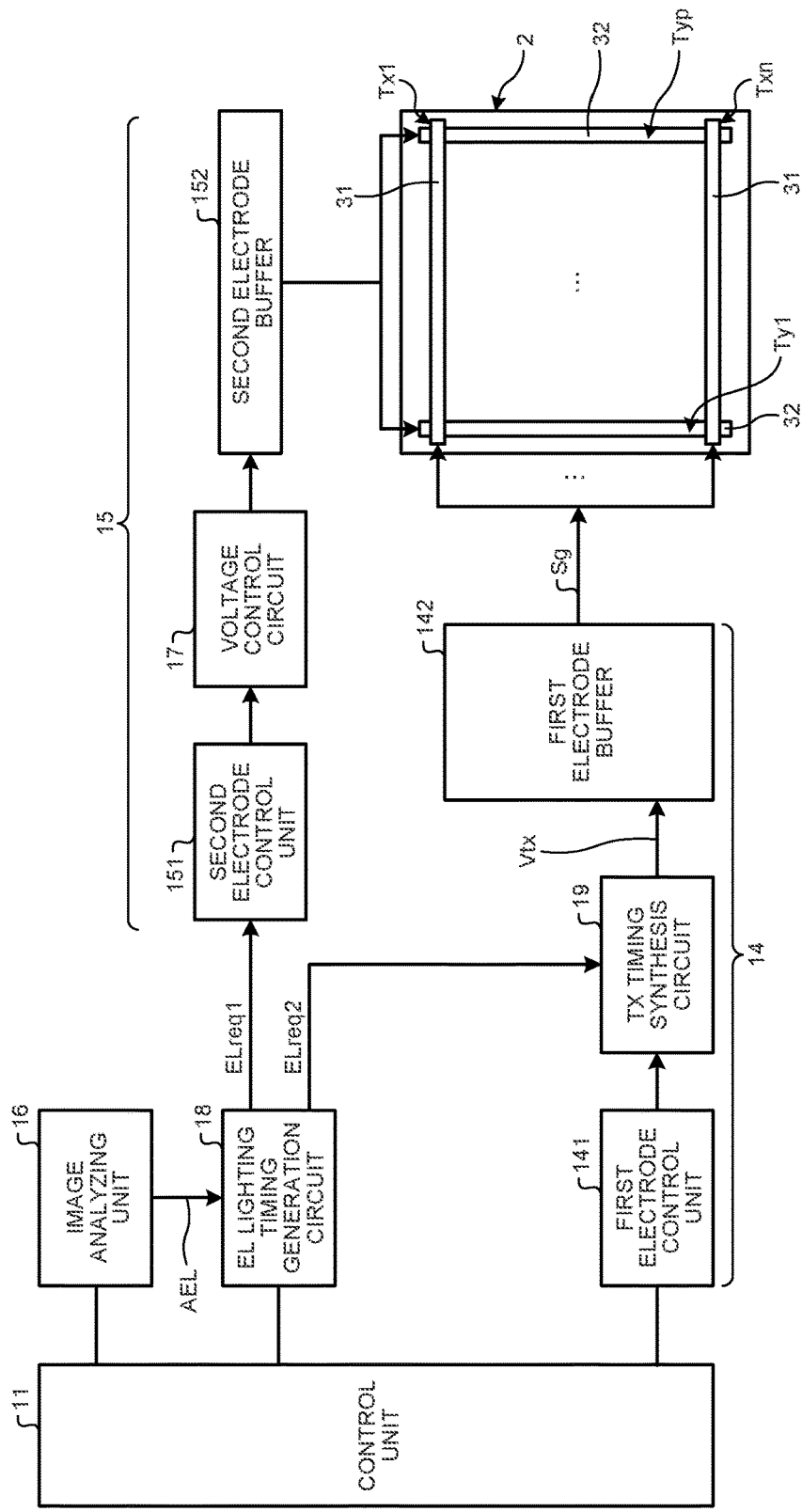
FIG. 12 is a diagram for explaining a first drive electrode driver and a second drive electrode driver according to the first embodiment.

FIG. 12 is a diagram for explaining the first drive electrode driver and the second drive electrode driver according to the first embodiment. The first electrode driver 14 includes a first electrode control unit 141, a Tx timing synthesis circuit 19, and a first electrode buffer 142. The first electrode control unit 141 controls the Tx timing synthesis circuit 19 based on the control signal supplied from the control unit 11. The control unit 11 causes an EL lighting timing generation circuit 18 to generate lighting request signals ELreq1 and ELreq2 based on lighting amount information AEL requested by an image analyzing unit 16. The EL lighting timing generation circuit 18 generates a voltage difference between the lighting request signal ELreq1 and the lighting request signal ELreq2 so as to correspond to the lighting amount of the light-emitting element unit DEL by setting a lighting period to be a high level (H) and a non-lighting period to be a low level (L), for example. The Tx timing synthesis circuit 19 synthesizes the pulse signal ELreq2 of the lighting period received from the EL lighting timing generation circuit 18 and a control signal of the first electrode control unit 141 and then transmits a drive signal Vtx to the first electrode buffer 142. Based on the drive signal Vtx, the first electrode buffer 142 supplies the amplified drive signal pulse Sg to the drive electrodes Tx1 to Txn (a part of the first conductive layers 31) of the input device 2 sequentially selected in the scanning direction Scan.

The second electrode driver 15 includes a second electrode control unit 151, a voltage control circuit 17, and a second electrode buffer 152. The second electrode control unit 151 requests electric power at a voltage based on the lighting request signal ELreq1 from the voltage control circuit 17. The voltage control circuit 17 generates the voltage based on the signal supplied from the second electrode control unit 151 and supplies the generated voltage to the second electrode buffer 152. The second electrode buffer 152 generates a voltage to be supplied to the second conductive layers 32 or a lighting pulse Sel, which will be described below. The second electrode buffer 152 supplies the voltage or the lighting pulse Sel to all the second conductive layers 32 (all the drive electrodes Ty1 to Typ) in the input device 2.

Figure 13:
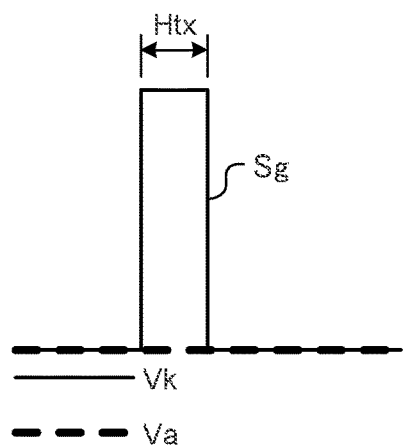
FIG. 13 is a diagram for explaining voltages applied to the first conductive layer and the second conductive layer in a drive electrode selection period in a state where a light-emitting element unit is turned off.
Figure 14:
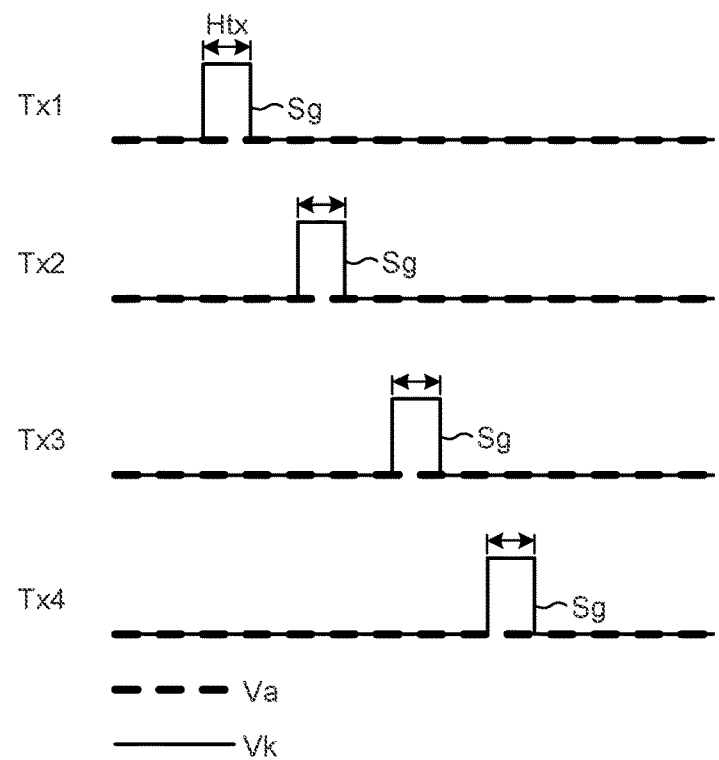
FIG. 14 is a diagram for explaining a scanning state in proximity detection in the state where the light-emitting element unit is turned off.

FIG. 13 is a diagram for explaining voltages applied to the first conductive layer and the second conductive layer in a drive electrode selection period in a state where the light-emitting element unit is turned off. FIG. 14 is a diagram for explaining a scanning state in proximity detection in the state where the light-emitting element unit is turned off. In FIGS. 13 to 16, the first conductive layer 31 serves as the cathode of the light-emitting element unit DEL, whereas the second conductive layer 32 serves as the anode of the light-emitting element unit DEL.

When the drive signal pulse Sg is applied to the input device 2 as illustrated in FIG. 6, a part of the third conductive layers 33 serves as the proximity detection electrodes Rx and the proximity detection signals Vdet depending on a proximity state of the external object is output to the proximity detection electrodes Rx. Based on the proximity detection signals Vdet, the proximity detecting unit 40 illustrated in FIG. 1 determines whether a proximity state is created and derives the coordinates and the like of the external object in the proximity detection area. To turn off the light-emitting element unit DEL, the second electrode control unit 151 performs control so as to make a voltage Va applied to the second conductive layer 32 closer to a voltage Vk applied to the first conductive layer 31. This control prevents the voltage difference between the voltage Vk applied to the first conductive layer 31 and the voltage Va applied to the second conductive layer 32 from reaching a forward light-emitting drive voltage. In this state, the first electrode driver 14 applies the drive signal pulse Sg, the rising direction of which is a reverse-bias direction, between the first conductive layer 31 and the second conductive layer 32 as illustrated in FIG. 13. With this control, when the drive signal pulse Sg is applied in a drive selection period Htx, only a reverse-bias voltage difference is applied between the first conductive layer 31 and the second conductive layer 32. As a result, emission of light from the light-emitting element unit DEL is suppressed.

When the first electrode driver 14 performs driving to sequentially and time-divisionally scan the drive electrodes Tx1 to Tx4 as illustrated in FIG. 14, the third conductive layers 33 output the proximity detection signals Vdet in response to application of the drive signal pulses Sg. Emission of light from the light-emitting element unit DEL is suppressed by any of the drive signal pulses Sg applied to the drive electrodes Tx1 to Tx4. As a result, the input device 2 serving as a front light is in a non-lighting state as a whole. The first electrode driver 14 can supply the drive signal pulses Sg at constant timing. With this configuration, the input device 2 can perform proximity detection with constant accuracy even when the input device 2 is in a non-lighting state as the front light.

Figure 15:
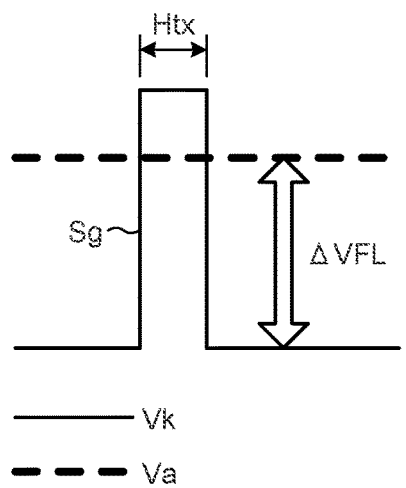
Figure 16:
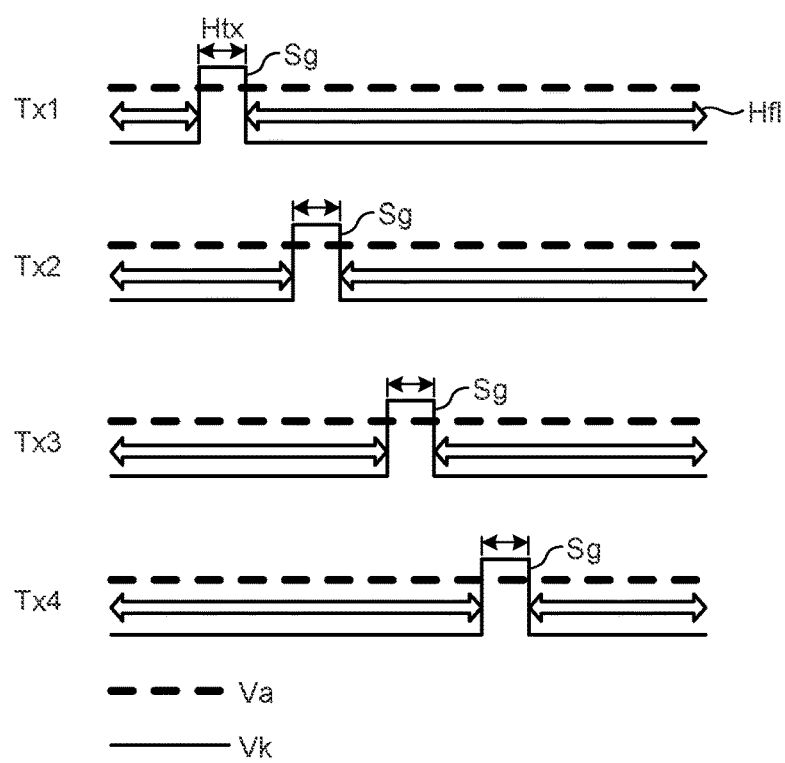

FIG. 15 is a diagram for explaining voltages applied to the first conductive layer and the second conductive layer in the drive electrode selection period in a state where the light-emitting element unit is turned on. FIG. 16 is a diagram for explaining the scanning state in proximity detection in the state where the light-emitting element unit is turned on. To turn on the light-emitting element unit DEL, the second electrode control unit 151 makes the difference between the voltage Vk applied to the first conductive layer 31 and the voltage Va applied to the second conductive layer 32 closer to a forward-bias light-emitting drive voltage ΔVFL. As illustrated in FIG. 15, the second electrode control unit 151 applies a forward-bias voltage of equal to or higher than the light-emitting drive voltage ΔVFL between the first conductive layer 31 and the second conductive layer 32. At this time, the first electrode driver 14 applies the drive signal pulse Sg, the rising direction of which is a reverse-bias direction, between the first conductive layer 31 and the second conductive layer 32. As a result, the light-emitting drive voltage ΔVFL is applied to the light-emitting element unit DEL except in the drive selection period Htx during which the drive signal pulse Sg is applied. With this control, the light-emitting element unit DEL emits light in a lighting period Hfl during which the light-emitting drive voltage ΔVFL is applied as illustrated in FIG. 16.

When the first electrode driver 14 performs driving to sequentially and time-divisionally scan the drive electrodes Tx1 to Tx4, the third conductive layers 33 output the proximity detection signals Vdet in response to application of the drive signal pulses Sg. Based on the proximity detection signals Vdet, the proximity detecting unit 40 illustrated in FIG. 1 determines whether a proximity state is created and derives the coordinates and the like of the external object in the proximity detection area. The voltage between the first conductive layer 31 and the second conductive layer 32 is made equal to or lower than the light-emitting drive voltage ΔVFL in any of the drive selection periods Htx of the drive electrodes Tx1 to Tx4. As a result, emission of light from the light-emitting element unit DEL is temporarily suppressed by any of the drive signal pulses Sg applied to the drive electrodes Tx1 to Tx4.

The control described above will be chronologically explained with reference to FIG. 16. A voltage of equal to or higher than the light-emitting drive voltage ΔVFL for the light-emitting element unit DEL is applied between the first conductive layers 31 corresponding to the drive electrodes Tx1 to Tx4 and the second conductive layers 32. Subsequently, the drive signal pulse Sg is applied, thereby temporarily turning off only the light-emitting element unit DEL coupled to the first conductive layer 31 corresponding to the drive electrode Tx1. At this time, no drive signal pulse Sg is applied to the first conductive layers 31 corresponding to the drive electrodes Tx2 to Tx4. As a result, the light-emitting element units DEL coupled to the first conductive layers 31 corresponding to the drive electrodes Tx2 to Tx4 remain turned on. As described above, the light-emitting element units DEL are temporarily turned off linearly along the first conductive layer 31 corresponding to the drive electrode Tx1.

Subsequently, the drive signal pulse Sg is applied, thereby temporarily turning off only the light-emitting element unit DEL coupled to the first conductive layer 31 corresponding to the drive electrode Tx2. At this time, no drive signal pulse Sg is applied to the first conductive layers 31 corresponding to the drive electrodes Tx1, Tx3, and Tx4. As a result, the light-emitting element units DEL coupled to the first conductive layers 31 corresponding to the drive electrodes Tx1, Tx3, and Tx4 remain turned on. As described above, the light-emitting element units DEL are temporarily turned off linearly along the first conductive layer 31 corresponding to the drive electrode Tx2. Similarly, the light-emitting element units DEL are temporarily turned off linearly along the first conductive layers 31 corresponding to the drive electrodes Tx3, Tx4, . . . , and Txn to which the drive signal pulses Sg are applied. The light-emitting element units DEL other than those linearly turned off remain turned on. Because the drive selection period Htx during which emission of light from the light-emitting element unit DEL is suppressed is shorter than the lighting period Hfl, turning-off or reduction of light emitted from the light-emitting element unit DEL is hard to be recognized. As a result, the input device 2 serving as a front light is in a lighting state as a whole. The first electrode driver 14 can supply the drive signal pulses Sg at constant timing. With this configuration, the input device 2 can perform proximity detection with constant accuracy even when the input device 2 is in a lighting state as the front light. The lighting amount of the light-emitting element unit DEL varies depending on the voltage Va applied to the second conductive layer 32 controlled by the voltage control circuit 17 based on an instruction from the control unit 11.

Figure 17:
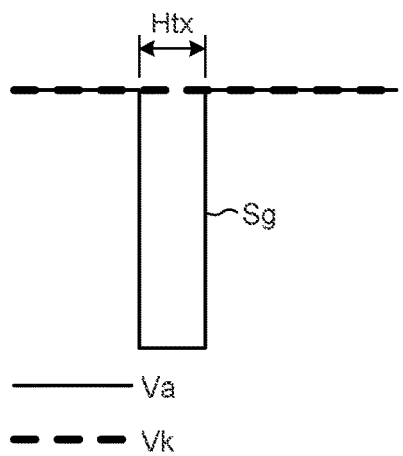
FIG. 17 is a diagram for explaining voltages applied to the first conductive layer and the second conductive layer in the drive electrode selection period in a state where the light-emitting element unit is turned off.
Figure 18:
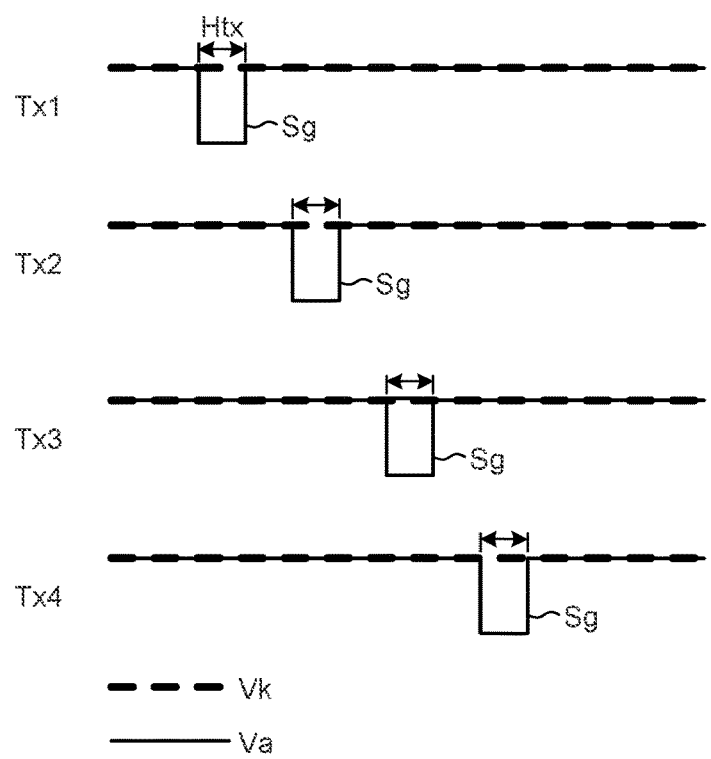
FIG. 18 is a diagram for explaining the scanning state in proximity detection in the state where the light-emitting element unit is turned off.

The first conductive layer 31 may serve as the anode of the light-emitting element unit DEL, and the second conductive layer 32 may serve as the cathode of the light-emitting element unit DEL. FIG. 17 is a diagram for explaining voltages applied to the first conductive layer and the second conductive layer in the drive electrode selection period in a state where the light-emitting element unit is turned off. FIG. 18 is a diagram for explaining the scanning state in proximity detection in the state where the light-emitting element unit is turned off. In FIG. 17 to and 20, the first conductive layer 31 serves as the anode of the light-emitting element unit DEL, whereas the second conductive layer 32 serves as the cathode of the light-emitting element unit DEL.

To turn off the light-emitting element unit DEL, the second electrode control unit 151 makes the voltage Vk applied to the second conductive layer 32 closer to the voltage Va applied to the first conductive layer 31. This control prevents the voltage difference between the voltage Vk applied to the first conductive layer 31 and the voltage Va applied to the second conductive layer 32 from reaching a forward light-emitting drive voltage. In this state, the first electrode driver 14 applies the drive signal pulse Sg, the rising direction of which is a reverse-bias direction, between the first conductive layer 31 and the second conductive layer 32 as illustrated in FIG. 17. Because the first conductive layer 31 and the second conductive layer 32 have different polarities as illustrated in FIG. 17, the reverse-bias direction is also made opposite. With this control, even when the drive signal pulse Sg is applied in the drive selection period Htx, emission of light from the light-emitting element unit DEL is suppressed. Even when the first electrode driver 14 performs driving to sequentially and time-divisionally scan the drive electrodes Tx1 to Tx4 as illustrated in FIG. 18, emission of light from the light-emitting element unit DEL is suppressed by any of the drive signal pulses Sg.

Figure 19:
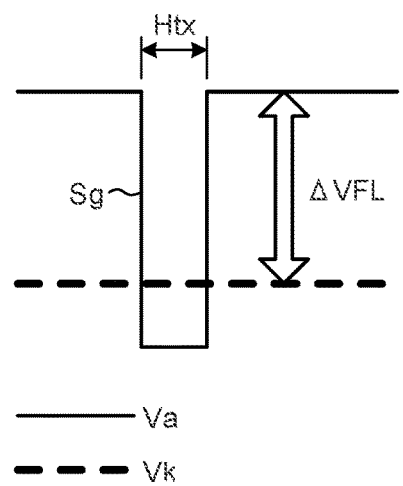
Figure 20:
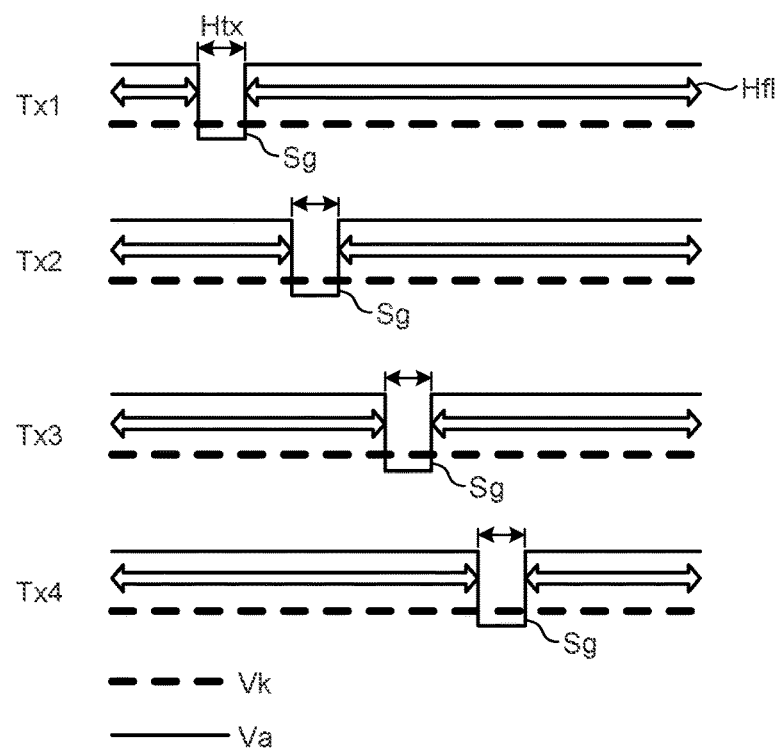

FIG. 19 is a diagram for explaining voltages applied to the first conductive layer and the second conductive layer in the drive electrode selection period in a state where the light-emitting element unit is turned on. FIG. 20 is a diagram for explaining the scanning state in proximity detection in the state where the light-emitting element unit is turned on. To turn on the light-emitting element unit DEL, the second electrode control unit 151 performs control so as to make the difference between the voltage Va applied to the first conductive layer 31 and the voltage Vk applied to the second conductive layer 32 closer to the forward-bias light-emitting drive voltage $\Delta$VFL. As a result, a forward-bias voltage of equal to or higher than the light-emitting drive voltage $\Delta$VFL is applied between the first conductive layer 31 and the second conductive layer 32 as illustrated in FIG. 19. At this time, the first electrode driver 14 applies the drive signal pulse Sg, the rising direction of which is a reverse-bias direction, between the first conductive layer 31 and the second conductive layer 32. As a result, the light-emitting drive voltage $\Delta$VFL is applied to the light-emitting element unit DEL except in the drive selection period Htx during which the drive signal pulse Sg is applied.

The control described above will be chronologically explained with reference to FIG. 20. A voltage of equal to or higher than the light-emitting drive voltage $\Delta$VFL for the light-emitting element unit DEL is applied between the first conductive layers 31 corresponding to the drive electrodes Tx1 to Tx4 and the second conductive layers 32. When the drive signal pulse Sg is applied to the drive electrode Tx1, the third conductive layers 33 (proximity detection electrodes) output the proximity detection signals Vdet in response to application of the drive signal pulse Sg. The proximity detecting unit 40 detects a voltage difference between the proximity detection signals Vdet at at least one timing of rising-up and falling-down of the drive signal pulse Sg. The input device 2 thus detects proximity of the external proximity object. Because the drive signal pulse Sg is applied, only the light-emitting element unit DEL coupled to the first conductive layer 31 corresponding to the drive electrode Tx1 is temporarily turned off. At this time, no drive signal pulse Sg is applied to the first conductive layers 31 corresponding to the drive electrodes Tx2 to Tx4. As a result, the light-emitting element units DEL coupled to the first conductive layers 31 corresponding to the drive electrodes Tx2 to Tx4 remain turned on. As described above, the light-emitting element units DEL are temporarily turned off linearly along the first conductive layer 31 (drive electrode Tx1) corresponding to the drive electrode Tx1.

Subsequently, when the drive signal pulse Sg is applied to the drive electrode Tx2, the third conductive layers 33 (proximity detection electrodes) output the proximity detection signals Vdet in response to application of the drive signal pulse Sg. The proximity detecting unit 40 detects a voltage difference between the proximity detection signals Vdet at at least one timing of rising-up and falling-down of the drive signal pulse Sg. The input device 2 thus detects proximity of the external proximity object. Because the drive signal pulse Sg is applied, only the light-emitting element unit DEL coupled to the first conductive layer 31 corresponding to the drive electrode Tx2 is temporarily turned off. At this time, no drive signal pulse Sg is applied to the first conductive layers 31 corresponding to the drive electrodes Tx1, Tx3, and Tx4. As a result, the light-emitting element units DEL coupled to the first conductive layers 31 corresponding to the drive electrodes Tx1, Tx3, and Tx4 remain turned on. As described above, the light-emitting element units DEL are temporarily turned off linearly along the first conductive layer 31 (drive electrode Tx2) corresponding to the drive electrode Tx2. Similarly, the light-emitting element units DEL are temporarily turned off linearly along the first conductive layers 31 corresponding to the drive electrodes Tx3, Tx4, . . . , and Txn to which the drive signal pulses Sg are applied.

Because the drive selection period Htx during which emission of light from the light-emitting element unit DEL is suppressed is shorter than the lighting period Hfl, turning-off or reduction of light emitted from the light-emitting element unit DEL is hard to be recognized. As a result, the input device 2 serving as a front light is in a lighting state as a whole. The first electrode driver 14 can supply the drive signal pulses Sg at constant timing. With this configuration, the input device 2 can perform proximity detection with constant accuracy even when the input device 2 is in a lighting state as the front light. The lighting amount of the light-emitting element unit DEL varies depending on the voltage Vk applied to the second conductive layer 32 controlled by the voltage control circuit 17.

As described above, the input device 2 according to the first embodiment includes the first conductive layers 31 formed in one layer and the second conductive layers 32 having a size overlapping with the first conductive layers in planar view. The drive signal pulse Sg is applied to a part of the first conductive layers 31. The drive signal pulse Sg rises in the reverse-bias direction opposite to the forward-bias voltage applied between the first conductive layers 31 and the second conductive layers 32 at which the light-emitting element unit DEL emits light.

Specifically, the input device 2 according to the first embodiment includes the first electrode driver 14, the second electrode driver 15, and the proximity detecting unit 40. The first electrode driver 14 supplies a voltage to the first conductive layers 31. The second electrode driver 15 supplies a voltage to the second conductive layers 32. The proximity detecting unit 40 detects a change in the electric field between the first conductive layers and the third conductive layers 33 depending on the coordinates of the proximity object present at a position overlapping with the first surface 201 of the first substrate 21 in planar view as the proximity detection signal Vdet in response to the drive signal pulse Sg. As described above, the first electrode driver 14 scans a part of the first conductive layers 31 as a detection block of drive electrodes in a time-division manner. The first electrode driver 14 then supplies the drive signal pulse Sg to the scanned part of the first conductive layers 31 (drive electrodes Tx).

In a case where the input device 2 according to the first embodiment functions as a front light, the second electrode driver 15 applies a forward-bias voltage between the first conductive layers 31 and the second conductive layers 32. When the second electrode driver 15 applies the light-emitting drive voltage ΔVFL, the light-emitting element units DEL emit light. The second electrode driver 15 controls the voltage value equal to or more than the light-emitting drive voltage ΔVFL, thereby controlling the lighting amount of the light-emitting element units DEL.

With this configuration, even when the drive signal pulse Sg is applied to a part of the first conductive layers 31, the input device 2 suppresses emission of light from the light-emitting element units DEL. Specifically, even when the drive signal pulse Sg is applied to the drive electrodes Tx of the first conductive layers 31, the input device 2 can suppress unintended emission of light from the light-emitting element units DEL.

Second Embodiment

Figure 21:
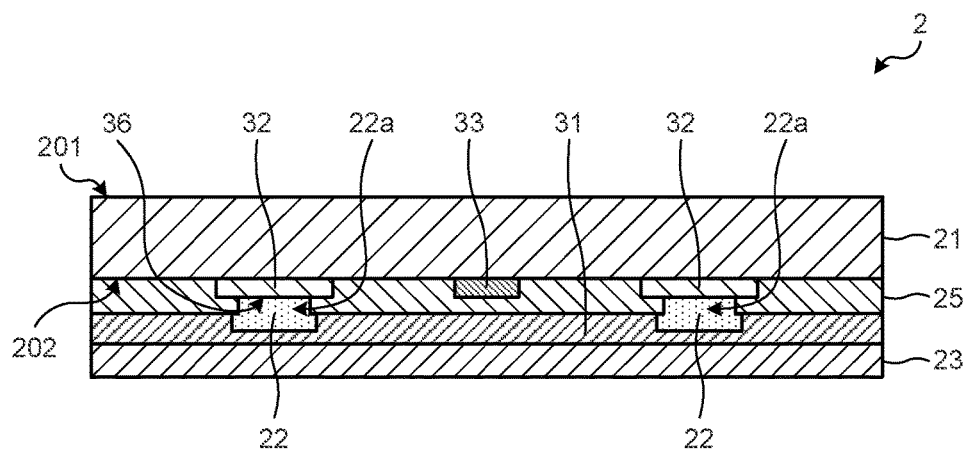
FIG. 21 is a sectional view schematically illustrating the structure of the input device according to a second embodiment of the present invention.
Figure 22:
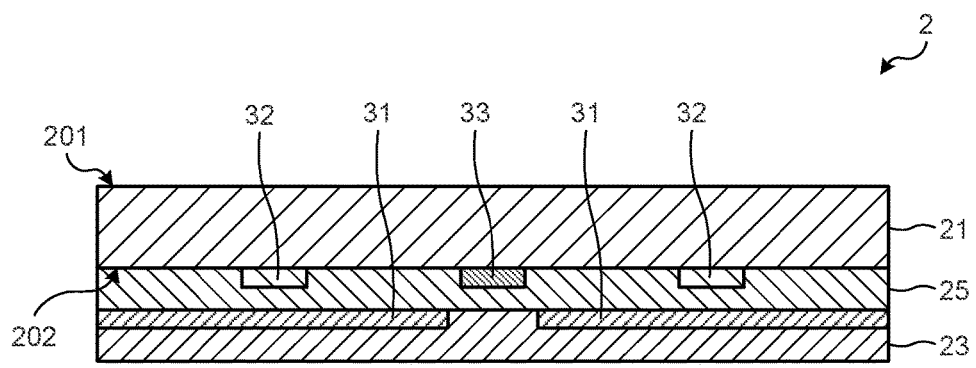
FIG. 22 is another sectional view schematically illustrating the structure of the input device according to the second embodiment.
Figure 23:
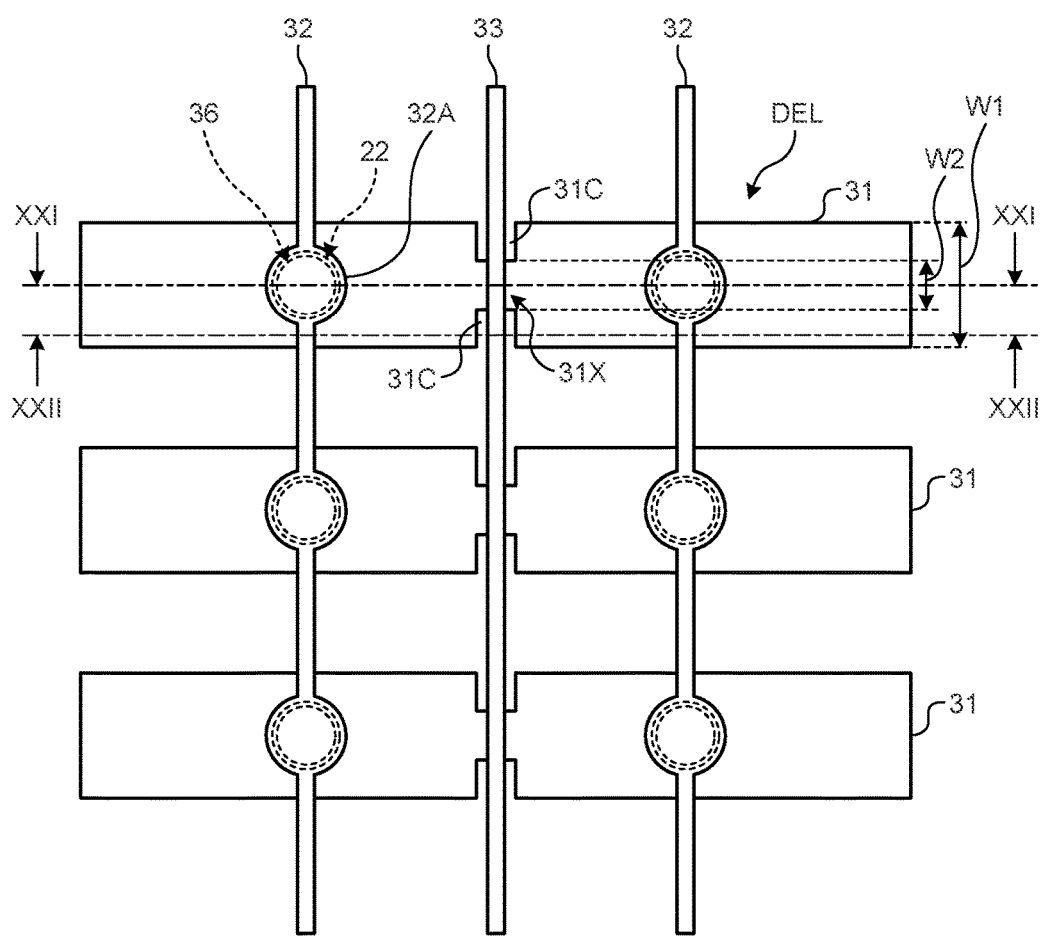
FIG. 23 is a diagram for explaining the positional relation in planar view among the first conductive layers, the second conductive layers, and the third conductive layers of the input device according to the second embodiment.

The following describes the input device 2 according to a second embodiment of the present invention. FIG. 21 is a sectional view schematically illustrating the structure of the input device according to the second embodiment. FIG. 22 is another sectional view schematically illustrating the structure of the input device according to the second embodiment. FIG. 23 is a diagram for explaining the positional relation in planar view among the first conductive layers, the second conductive layers, and the third conductive layers of the input device according to the second embodiment. The section illustrated in FIG. 21 is a section along line XXI-XXI in FIG. 23. The section illustrated in FIG. 22 is a section along line XXII-XXII in FIG. 23. Components identical with those described in the first embodiment are denoted by like reference numerals, and overlapping explanation thereof will be omitted.

As illustrated in FIGS. 21 to 23, the input device 2 according to the second embodiment includes the first substrate 21, the first conductive layers 31, the second conductive layers 32, the luminescent layers 22, and the third conductive layers 33. The first conductive layers 31 are covered with the insulating protective layer 23. The insulating protective layer 23 is not necessarily provided.

As illustrated in FIGS. 21 to 23, each of the luminescent layers 22 has a size overlapping with one of the second conductive layers 32 and one of the first conductive layers 31 in planar view. As illustrated in FIG. 23, the luminescent layers 22 are scattered like islands in planar view.

Specifically, as illustrated in FIG. 21, each of the luminescent layers 22 has a protrusion 22a protruding toward the second surface 202. The insulation layer 25 is provided between the second conductive layers 32 and the luminescent layers 22. The luminescent layer 22 is electrically in contact with the second conductive layer 32 at the protrusion 22a via the contact portion 36. The contact portion 36 is electrically in contact with the second conductive layer 32 at the protrusion 22a. In other words, one of the first conductive layers 31 is electrically coupled to one of the second conductive layers 32 via the luminescent layer 22 at the contact portion 36.

As illustrated in FIGS. 21 and 22, the first conductive layers 31 are formed in one layer on the second surface 202 side of the first substrate 21. As illustrated in FIG. 23, the first conductive layers 31 have a shape continuously extending in one direction in planar view. As illustrated in FIG. 21, the insulation layer 25 is provided around the luminescent layers 22.

As illustrated in FIGS. 21 to 23, the second conductive layers 32 and the third conductive layers 33 are formed in one layer on the second surface 202 side of the first substrate 21. As illustrated in FIG. 23, the second conductive layers 32 have a shape continuously extending in one direction in planar view. Similarly, the third conductive layers 33 have a shape continuously extending in one direction in planar view. As illustrated in FIGS. 21 and 22, the insulation layer 25 is provided between the third conductive layers 33 and the first conductive layers 31.

Assume that the direction in which the first conductive layers 31 extend is the first direction, and the direction in which the second conductive layers 32 extend is the second direction. In this case, the first conductive layers 31 each have a recess 31C having a smaller width in the second direction at a portion where the first conductive layer 31 intersects with the third conductive layer 33 in planar view. In other words, a width w2 of an intersection 31X of the first conductive layer 31 intersecting with the third conductive layer 33 in planar view is smaller than a width w1 of a portion where the first conductive layer 31 intersects with the second conductive layer 32 in planar view. With this structure, the capacitance is adjusted between the first conductive layers 31 and the third conductive layers 33. This structure makes it possible to increase the width w1 of the first conductive layer 31 extending between adjacent third conductive layers 33 in planar view, thereby increasing the width in which the second conductive layer 32 overlaps with the first conductive layer 31 in planar view.

The light-emitting element unit DEL includes the first conductive layer 31, the luminescent layer 22, and the second conductive layer 32. The protrusion 22a of the luminescent layer 22 emits light by a forward-bias voltage being applied to the first conductive layer 31 and the second conductive layer 32. When the voltage is applied to the light-emitting element unit DEL, the luminescent layer 22 emits light along the shape thereof. As a result, a light-emitting unit is partially generated in planar view, whereby the input device 2 functions as a front light that can output light to the display unit 9 illustrated in FIG. 8.

The first light-blocking portions 32A are formed in the same layer as the layer provided in which the second conductive layers 32 are formed. The first light-blocking portions 32A are wide portions in which the width of the second conductive layers 32 is broadened in the first direction intersecting with the second direction in which the second conductive layers 32 extend. The length of the first light-blocking portions 32A in the first direction is larger than the maximum length of the contract portions 36 in the first direction. The first light-blocking portions 32A can cover the respective contact portions 36 viewed in a direction perpendicular to the first surface 201 of the first substrate 21. This structure can decrease the resistance at the contact portions 36, thereby increasing the light emission efficiency of the light-emitting element units DEL.

The first light-blocking portions 32A have a light-blocking property and may be made of any material as long as having the light-blocking property. The first light-blocking portions 32A are preferably made of a metal material having metallic luster, such as Al, Ag, and Cr, and an alloy containing these metals to reflect light emitted from the luminescent layers 22. The first light-blocking portions 32A are preferably made of the same material as that of the second conductive layers 32 for easier fabrication. As described above, the light-emitting element units DEL each include the first light-blocking portion 32A, thereby suppressing leakage of light toward the first surface 201 of the first substrate 21.

As described above, the first conductive layers 31 correspond to the drive electrodes Tx from which the drive signal pulse Sg is applied, whereas the third conductive layers 33 correspond to the proximity detection electrodes Rx (refer to FIG. 7). When the input device 2 performs a proximity detection operation, the third conductive layers 33 output, to the proximity detecting unit 40 (refer to FIG. 1), a change in the electric field between the first conductive layers 31 and the third conductive layers 33 depending on the coordinates of the proximity object present at a position overlapping with the first surface 201 of the first substrate 21 in planar view.

To manufacture the input device 2, the first substrate 21 is prepared, and the second conductive layers 32 and the third conductive layers 33 are simultaneously patterned on the second surface 202 of the first substrate 21. The insulation layer 25 is then formed so as to cover the second conductive layers 32 and the third conductive layers 33 in the input device 2. A part of the insulation layer 25 is then etched by wet etching or dry etching, for example, to expose the positions corresponding to the respective contact portions 36 on the second conductive layers 32. The luminescent layers 22 are then patterned and formed so as to cover the surface of the insulation layer 25 and the contact portions 36. One of the first conductive layers 31 is then patterned so as to cover the surface of the luminescent layer 22 in the input device 2. The protective layer 23 containing a light-transmissive insulator, such as $Al_2O_3$, is then formed in the input device 2. As described above, the second conductive layers 32 and the third conductive layers 33 are simultaneously formed in the input device 2 according to the second embodiment. As a result, the input device 2 can be manufactured at a lower cost.

Because the second conductive layers 32 and the third conductive layers 33 are formed at the same level (same layer), the input device 2 has a smaller thickness.

Modification of the Second Embodiment

Figure 24:
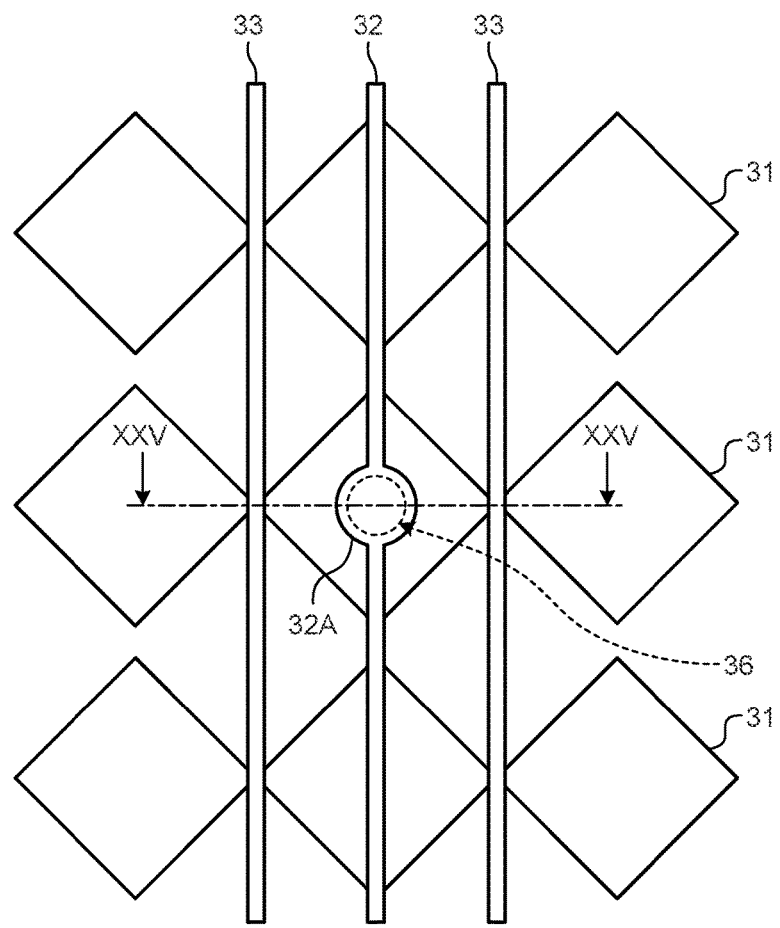
FIG. 24 is a diagram for explaining the positional relation in planar view among the first conductive layers, the second conductive layers, and the third conductive layers of the input device according to a modification of the second embodiment.
Figure 25:
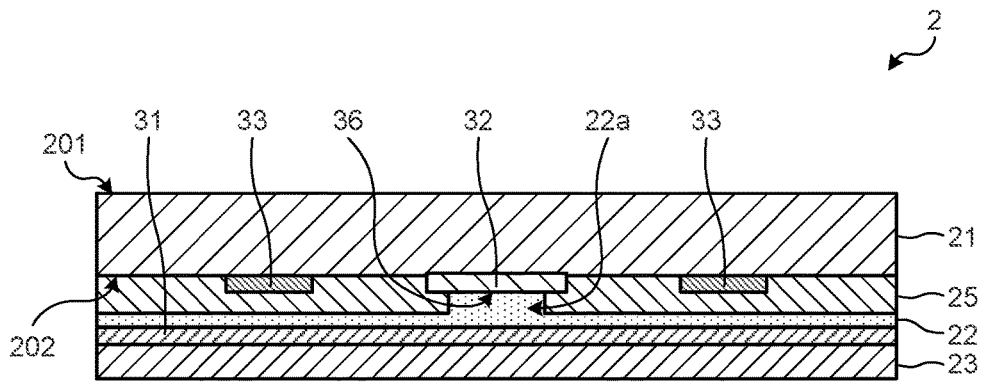
FIG. 25 is a sectional view schematically illustrating the structure of the input device according to the modification of the second embodiment.

The following describes the input device 2 according to a modification of the second embodiment. FIG. 24 is a diagram for explaining the positional relation in planar view among the first conductive layers, the second conductive layers, and the third conductive layers of the input device according to the modification of the second embodiment. FIG. 25 is a sectional view schematically illustrating the structure of the input device according to the modification of the second embodiment. The section illustrated in FIG. 25 is a section along line XXV-XXV in FIG. 24. Components identical with those described in the first and the second embodiments are denoted by like reference numerals, and overlapping explanation thereof will be omitted.

As illustrated in FIG. 24, the first conductive layers 31 have a shape of rectangles continuously connected to one another in planar view. The shape of the first conductive layers 31 is not limited to a rectangle and may be a planar shape, such as a diamond shape, a lozenge, or a square with chamfered corners.

The luminescent layer 22 has a size overlapping with the second conductive layers 32 and the third conductive layers 33 in planar view. The luminescent layer 22, for example, is a flat film having a size covering the second surface 202 in planar view. As illustrated in FIG. 25, the luminescent layer 22 is provided between the first conductive layers 31 and the second conductive layers 32. The protrusion 22a of the luminescent layer 22 is electrically in contact with the second conductive layer 32.

The first light-blocking portion 32A is formed in the same layer as the layer in which the second conductive layer 32 is formed. The first light-blocking portion 32A is a wide portion in which the width of the second conductive layer 32 is broadened in the second direction intersecting with the first direction in which the first conductive layers 31 extend. As illustrated in FIG. 24, the first light-blocking portion 32A is not provided to all the portions at which the second conductive layer 32 intersects with the first conductive layers 31 in planar view unlike the second embodiment. The first light-blocking portion 32A is provided to a part of the intersections provided with the protrusion 22a of the luminescent layer 22.

As described above, the first conductive layers 31 according to the second embodiment and the modification thereof function not only as electrodes of the light-emitting element units DEL but also as the drive electrodes Tx of the input device 2. This configuration can reduce the thickness of the input device 2.

The input device 2 according to the second embodiment and the modification thereof can be driven by the same drive control as that of the input device 2 according to the first embodiment.

Third Embodiment

Figure 26:
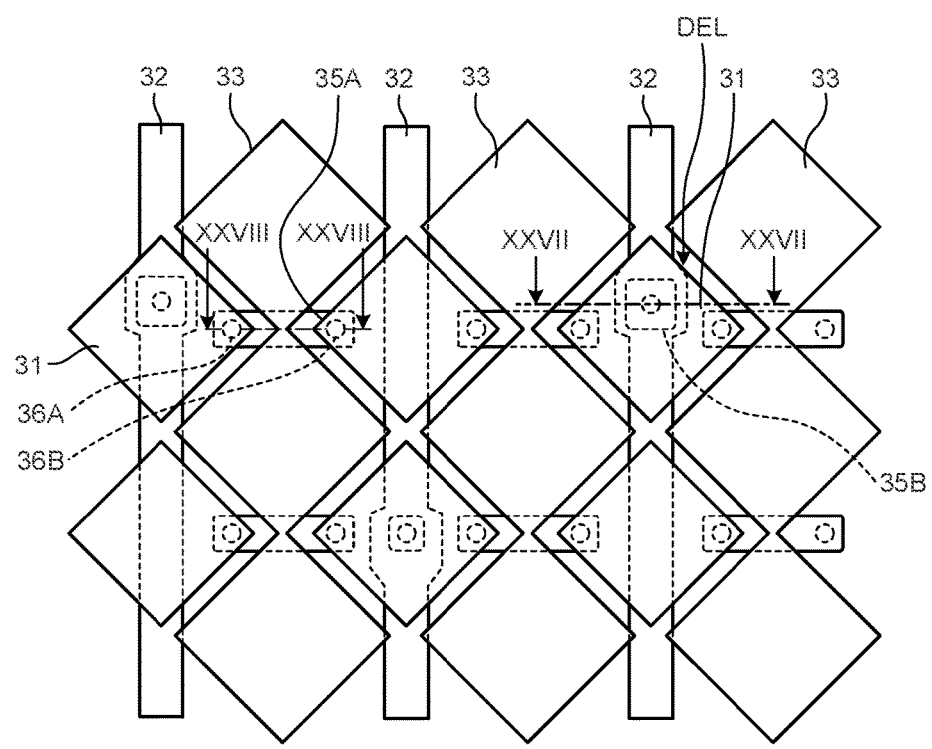
FIG. 26 is a diagram for explaining the positional relation in planar view between the first conductive layers and the third conductive layers of the input device according to a third embodiment of the present invention.
Figure 27:
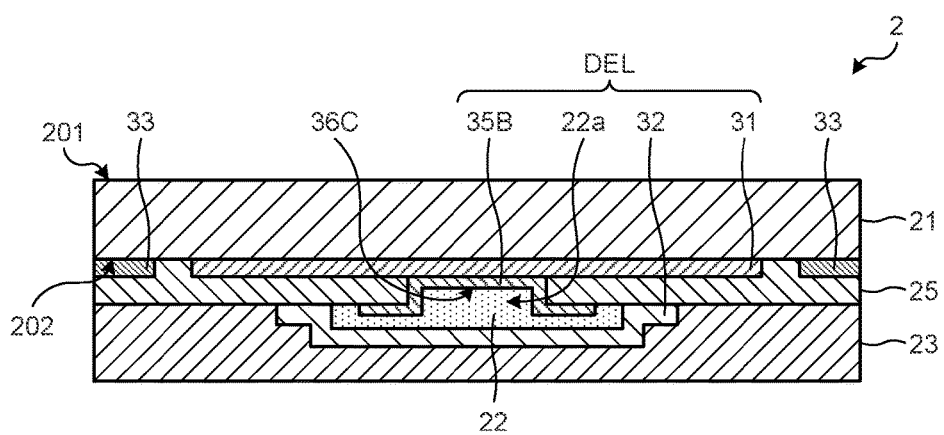
FIG. 27 is a sectional view schematically illustrating the structure of the input device according to the third embodiment.
Figure 28:
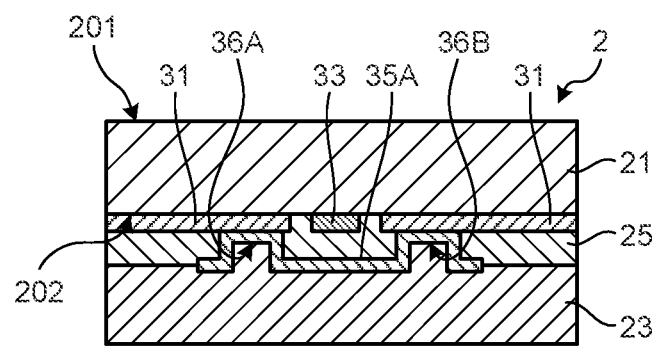
FIG. 28 is another sectional view schematically illustrating the structure of the input device according to the third embodiment.

The following describes the input device 2 according to a third embodiment of the present invention. FIG. 26 is a diagram for explaining the positional relation in planar view between the first conductive layers and the third conductive layers of the input device according to the third embodiment. FIG. 27 is a sectional view schematically illustrating the structure of the input device according to the third embodiment. FIG. 28 is another sectional view schematically illustrating the structure of the input device according to the third embodiment. The section illustrated in FIG. 27 is a section along line XXVII-XXVII in FIG. 26. The section illustrated in FIG. 28 is a section along line XXVIII-XXVIII in FIG. 26. Components identical with those described in the first and the second embodiments and the modification of the second embodiment are denoted by like reference numerals, and overlapping explanation thereof will be omitted.

As illustrated in FIGS. 26 to 28, the input device 2 according to the third embodiment includes the first substrate 21, the first conductive layers 31, the second conductive layers 32, the luminescent layers 22, the third conductive layers 33, the insulation layer 25, fourth conductive layers 35B, and fifth conductive layers 35A. The second conductive layers 32 are covered with the insulating protective layer 23. The insulating protective layer 23 is not necessarily provided.

As illustrated in FIGS. 27 and 28, the first conductive layers 31 are formed in one layer on the second surface 202 side of the first substrate 21. As illustrated in FIGS. 27 and 28, the first conductive layers 31 are scattered like islands in planar view. The insulation layer 25 is provided between the first conductive layers 31 and the luminescent layers 22. Each of the fifth conductive layers 35A couples the ends of adjacent first conductive layers 31 separated by the third conductive layer 33 with contact portions 36A and 36B, thereby connecting the adjacent first conductive layers 31 in a manner insulated from the third conductive layer 33. With this configuration, the first conductive layers 31 are coupled to one another by the fifth conductive layers 35A in a manner extending in one direction as illustrated in FIG. 26.

As illustrated in FIGS. 27 and 28, the third conductive layers 33 are formed in one layer on the second surface 202 side of the first substrate 21. As illustrated in FIG. 26, the third conductive layers 33 have a shape of rectangles continuously extending in the second direction intersecting with the first direction in which the first conductive layers 31 extend in planar view. As illustrated in FIGS. 27 and 28, the third conductive layers 33 do not face the luminescent layers 22. The first conductive layers 31 are insulated from the third conductive layers 33 by the insulation layer 25.

The shape of the first conductive layers 31 is not limited to a rectangle and may be a planar shape, such as a diamond shape, a lozenge, or a square with chamfered corners. The shape of the first conductive layers 31 simply needs to fill unoccupied areas between adjacent third conductive layers 33 out of the third conductive layers 33 in planar view in a manner insulated therefrom. Similarly, the shape of the third conductive layers 33 is not limited to a shape of rectangles and may be a shape obtained by electrically coupling planar shapes, such as diamond shapes, lozenges, or squares with chamfered corners, in the second direction. The shape of the third conductive layers 33 simply needs to fill unoccupied areas between adjacent first conductive layers 31 out of the first conductive layers 31 in planar view in a manner insulated therefrom.

Because the first conductive layers 31 have a large width, the first conductive layers 31 are made of a transparent light-transmissive conductive material, such as ITO and IZO. This structure enables bright display of an image output from the display unit 9 to the observer. Because the third conductive layers 33 have a large width, the third conductive layers 33 are made of a transparent light-transmissive conductive material, such as ITO and IZO. This structure also enables bright display of an image output from the display unit 9 to the observer.

As illustrated in FIGS. 27 and 28, the second conductive layers 32 are formed in one layer on the second surface 202 side of the first substrate 21. As illustrated in FIG. 26, the second conductive layers 32 have a shape continuously extending in one direction in planar view. The insulation layer 25 is provided between the second conductive layers 32 and the luminescent layers 22. The second conductive layers 32 are made of a transparent light-transmissive conductive material, such as ITO and IZO, or a conductive metal material.

As illustrated in FIGS. 27 and 28, the third conductive layers 33 are formed in one layer on the second surface 202 side of the first substrate 21. The third conductive layers 33 are formed in the same layer as the layer in which the first conductive layers 31 are formed. As illustrated in FIG. 26, the third conductive layers 33 have a shape continuously extending in one direction in planar view. The third conductive layers 33 extend in the same direction as that of the first conductive layers 31 and do not intersect therewith in planar view. The third conductive layers 33, for example, extend in parallel with the first conductive layers 31 in planar view.

As illustrated in FIGS. 26 and 27, each of the luminescent layers 22 has a size overlapping with one of the second conductive layers 32 and one of the first conductive layers 31 in planar view. In other words, the luminescent layers 22 are scattered like islands in planar view.

Specifically, as illustrated in FIG. 27, the luminescent layer 22 has the protrusion 22a protruding toward the second surface 202. The insulation layer 25 is provided between the first conductive layers 31 and the luminescent layer 22. The insulation layer 25 surrounds the periphery of the luminescent layer 22. The luminescent layer 22 is electrically in contact with the first conductive layer 31 at the protrusion 22a via the fourth conductive layer 35B. A contact portion 36C is electrically in contact with the first conductive layer 31 at the protrusion 22a via the fourth conductive layer 35B. In other words, one of the first conductive layers 31 is electrically coupled to one of the second conductive layers 32 at the contact portion 36C.

The light-emitting element unit DEL includes the first conductive layer 31, the luminescent layer 22, and the second conductive layer 32. The luminescent layer 22 emits light by a forward-bias voltage being applied to the first conductive layer 31 and the second conductive layer 32. When the voltage is applied to the light-emitting element unit DEL, the protrusion 22a of the luminescent layer 22 emits light along the shape of the fourth conductive layer 35B electrically coupled to the first conductive layer 31. As a result, a light-emitting unit is partially generated in planar view, whereby the input device 2 functions as a front light that can output light to the display unit 9 illustrated in FIG. 8.

Because the first conductive layers 31 have a large width as illustrated in FIG. 26, the input device 2 according to the third embodiment has a higher degree of freedom in arrangement of the light-emitting element units DEL (fourth conductive layers 35B).

To manufacture the input device 2, the first substrate 21 is prepared, and the first conductive layers 31 and the third conductive layers 33 are simultaneously patterned on the second surface 202 of the first substrate 21. The insulation layer 25 is then formed so as to cover the first conductive layers 31 and the third conductive layers 33 in the input device 2. A part of the insulation layer 25 is then etched by wet etching or dry etching, for example, to expose the positions corresponding to the respective contact portions 36A, 36B, and 36C on the first conductive layers 31. The fifth conductive layers 35A are then formed on the surface of the insulation layer 25 and the contact portions 36A and 36B so as to couple the ends of the first conductive layers 31 separated by the third conductive layers 33 in the input device 2. At this time, the fourth conductive layers 35B are also formed on the respective contact portions 36C. The luminescent layers 22 are then formed so as to cover the fourth conductive layers 35B. The second conductive layers 32 are then patterned and formed so as to cover the luminescent layers 22 in the input device 2. The protective layer 23 containing a light-transmissive insulator, such as $Al_2O_3$, is then formed in the input device 2. As described above, the first conductive layers 31 and the third conductive layers 33 are simultaneously formed in the input device 2 according to the third embodiment. As a result, the input device 2 can be manufactured at a lower cost.

As described above, the first conductive layers 31 according to the third embodiment function not only as electrodes of the light-emitting element units DEL but also as the drive electrodes Tx of the input device 2. This configuration can reduce the thickness of the input device 2.

The input device 2 according to the third embodiment can be driven by the same drive control as that of the input device 2 according to the first embodiment.

Modification of the Third Embodiment

Figure 29:
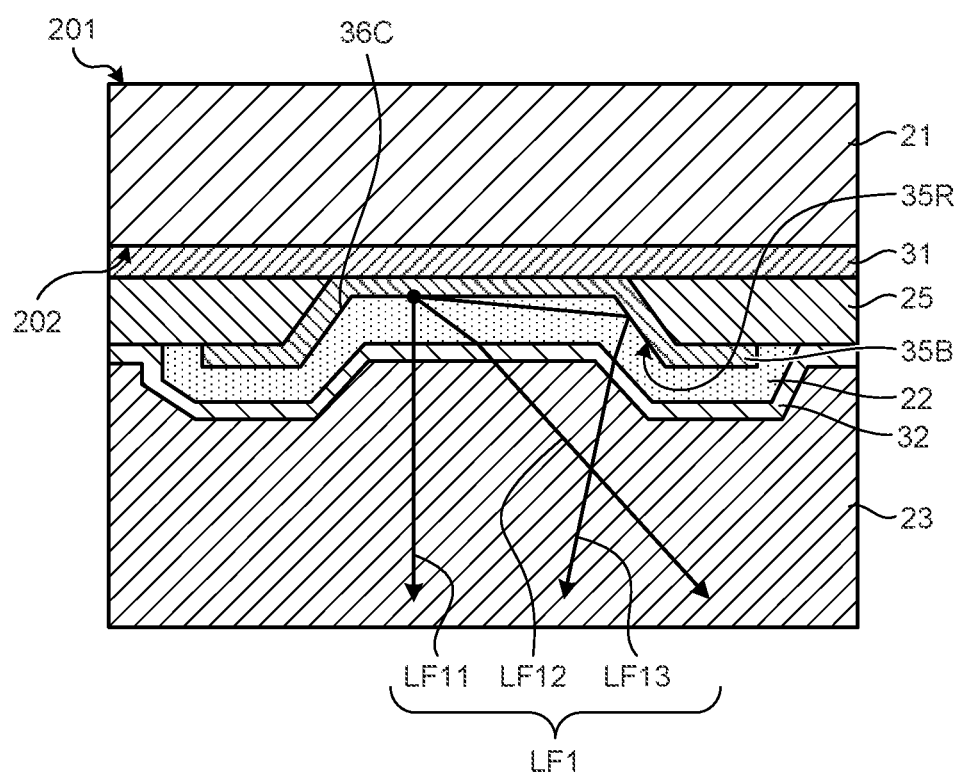
FIG. 29 is an enlarged sectional view for explaining irradiation light at a contact portion in the input device according to a modification of the third embodiment.
Figure 30:
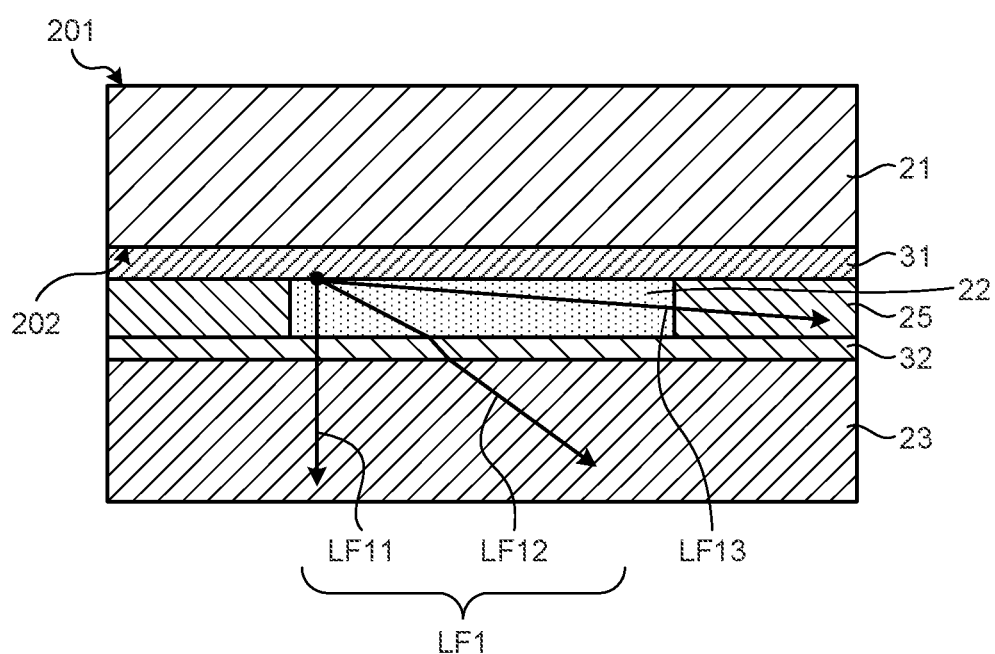
FIG. 30 is an enlarged sectional view for explaining the irradiation light in the input device according to a comparative example.

The following describes the input device 2 according to a modification of the third embodiment. FIG. 29 is an enlarged sectional view for explaining irradiation light at the contact portion in the input device according to the modification of the third embodiment. The section illustrated in FIG. 29 is a modification of a part of the section along line XXVII-XXVII in FIG. 26. FIG. 30 is an enlarged sectional view for explaining the irradiation light in the input device according to a comparative example. Components identical with those described in the first and the second embodiments are denoted by like reference numerals, and overlapping explanation thereof will be omitted.

As illustrated in FIG. 29, the luminescent layer 22 has a protrusion formed such that the area of the section of the contact portion 36C parallel to the second surface 202 decreases as it comes closer to the second surface 202. The fourth conductive layer 35B made of a metal having metallic luster is in contact with the luminescent layer 22 at the contact portion 36C. Side surfaces 35R of the protrusion are inclination surfaces inclined with respect to the second surface 202.

As illustrated in FIG. 30, the luminescent layer 22 according to the comparative example is directly in contact with the first conductive layers 31, and the surface in contact with the first conductive layers 31 is substantially flat. This structure allows only light LF11 and LF12 to travel in the LF1 direction from the input device 2 illustrated in FIG. 8 among radial light LF11, LF12, and LF13 emitted from the luminescent layer 22 according to the comparative example.

On the other hand, as illustrated in FIG. 29, the radial light LF13 emitted from the luminescent layer 22 according to the modification of the third embodiment is reflected by the side surface 35R of the protrusion. The angle of the light LF13 is thus directed in the LF1 direction from the input device 2 illustrated in FIG. 8. As a result, all of the light LF11, LF12, and LF13 emitted from the luminescent layer 22 can travel from the input device 2 illustrated in FIG. 8 in the LF1 direction. This structure can increase the light emission efficiency of the input device 2 according to the modification of the third embodiment serving as a front light.

The input device 2 according to the modification of the third embodiment can be driven by the same drive control as that of the input device 2 according to the first embodiment.

Fourth Embodiment

Figure 31:
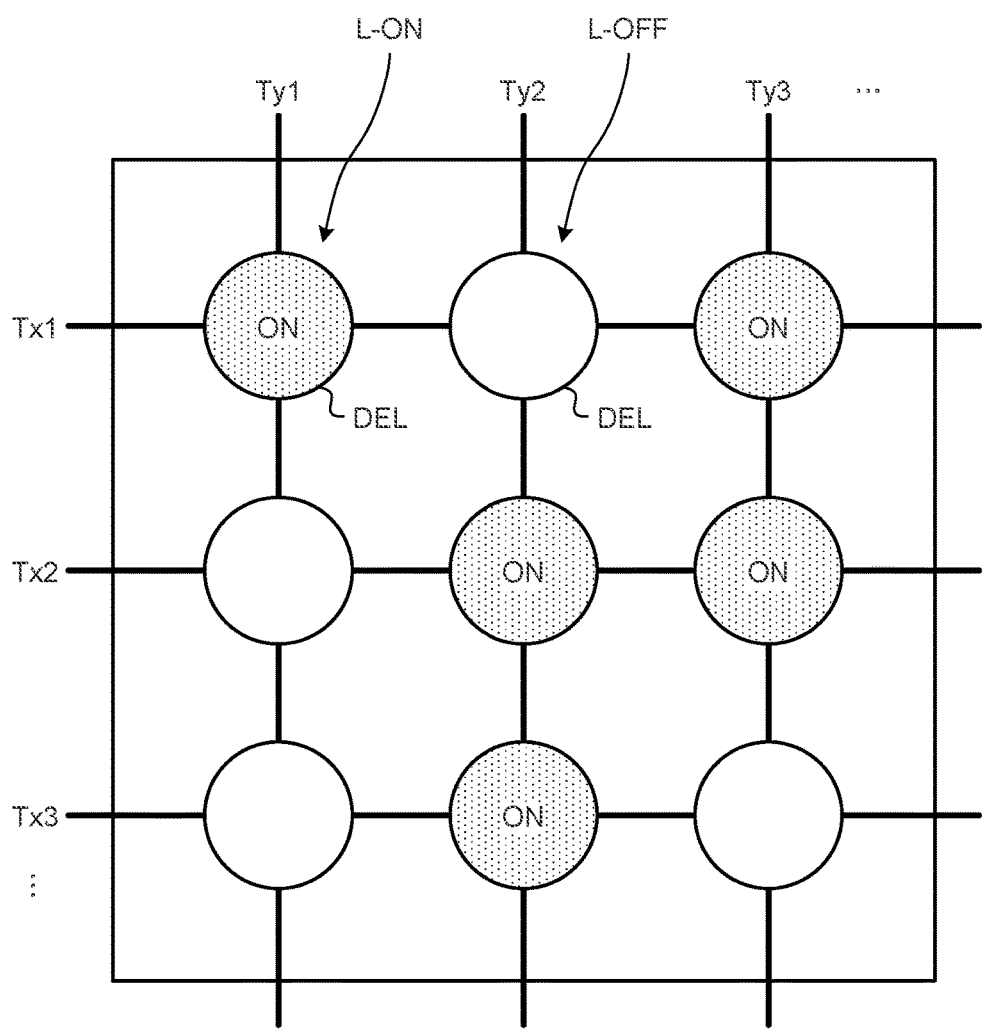
FIG. 31 is a diagram for explaining a lighting state of a plurality of light-emitting element units in a plane.
Figure 32:
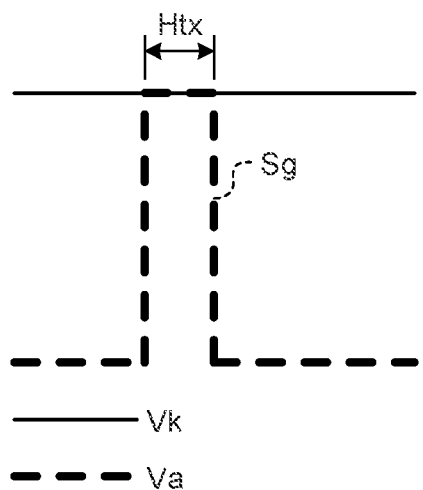
FIG. 32 is a diagram for explaining voltages applied to the first conductive layer and the second conductive layer in the drive electrode selection period in a state where the light-emitting element unit is turned off.
Figure 33:
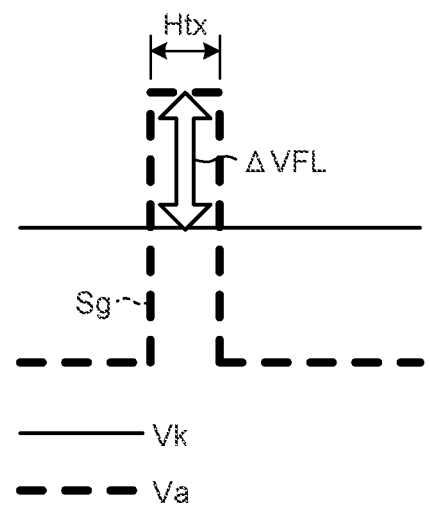
Figure 34:
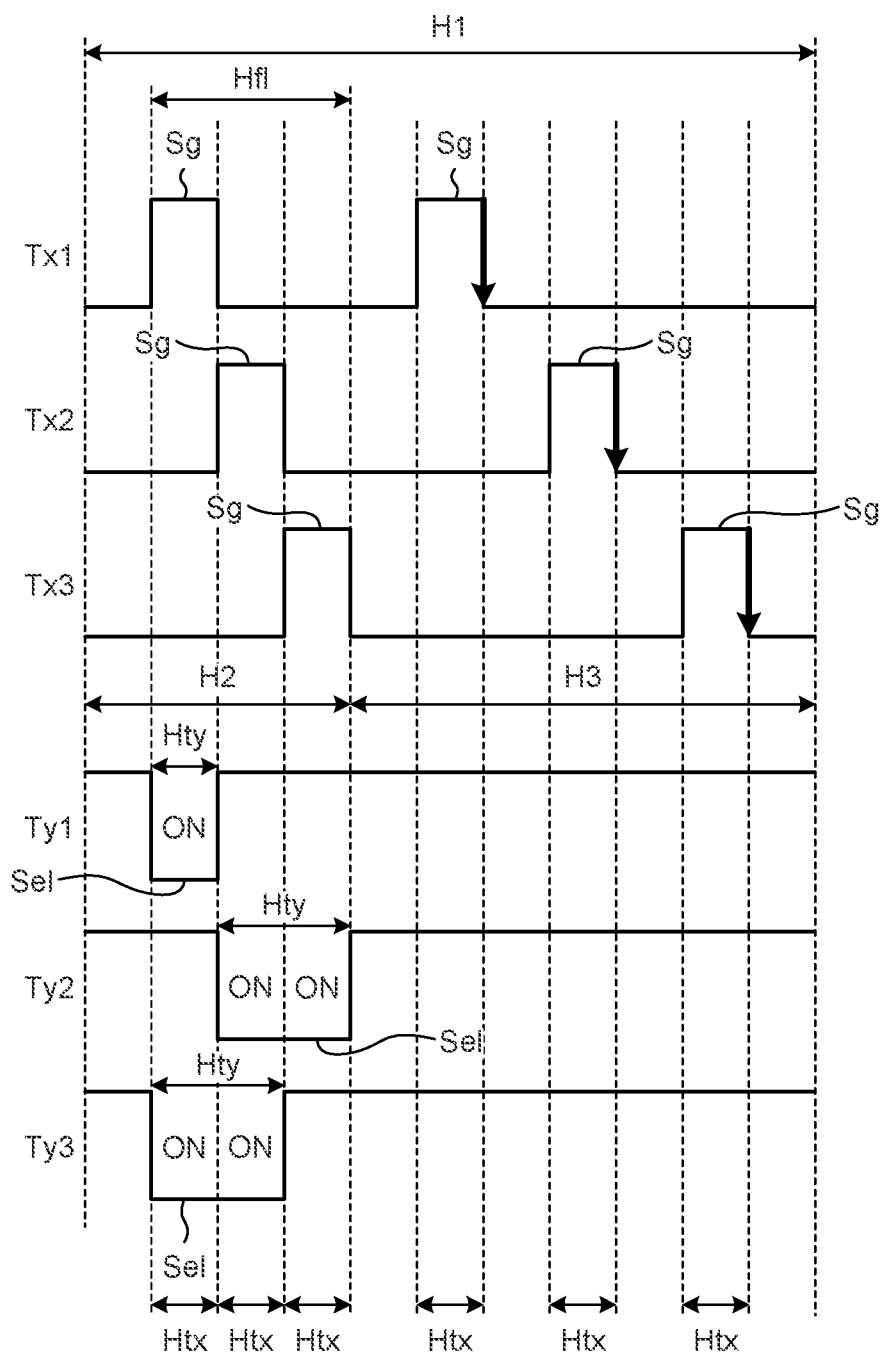
FIG. 34 is a timing chart illustrating a case where a lighting request period does not coincide with a proximity detection period in drive control according to a fourth embodiment of the present invention.

The following describes drive control performed by the input device 2 according to a fourth embodiment of the present invention with reference to FIGS. 1, 6, 7, 12, and 31 to 37. FIG. 31 is a diagram for explaining a lighting state of the light-emitting element units in a plane. FIG. 32 is a diagram for explaining voltages applied to the first conductive layer and the second conductive layer in the drive electrode selection period in a state where the light-emitting element unit is turned off. FIG. 33 is a diagram for explaining voltages applied to the first conductive layer and the second conductive layer in the drive electrode selection period in a state where the light-emitting element unit is turned on. FIG. 34 is a timing chart illustrating a case where a lighting request period does not coincide with a proximity detection period in drive control according to the fourth embodiment. In the following description, the input device 2 according to the fourth embodiment is explained using the input device 2 according to the second embodiment as an example. The technology according to the fourth embodiment is also applicable to any of the input devices described in the third embodiment and the modification thereof. Components identical with those described in the second and the third embodiments are denoted by like reference numerals, and overlapping explanation thereof will be omitted.

In the above description on the input device 2 according to the first to the third embodiments, the drive control to make the entire plane into a lighting state as a front light is provided as an example. The following describes drive control in the input device 2 according to the fourth embodiment to make not only the entire plane but also a desired part in the plane into a lighting state as a front light. In FIGS. 31 to 37, the first conductive layer 31 serves as the anode of the light-emitting element unit DEL, whereas the second conductive layer 32 serves as the cathode of the light-emitting element unit DEL. Alternatively, the first conductive layer 31 may serve as the cathode of the light-emitting element unit DEL, and the second conductive layer 32 may serve as the anode of the light-emitting element unit DEL like in the embodiments above.

As illustrated in FIG. 31, the input device 2 can perform control such that the light-emitting element units DEL are individually made into a lighting state L-ON or a non-lighting state L-OFF in the plane. The image analyzing unit 16 illustrated in FIG. 12 identifies the lighting state L-ON or the non-lighting state L-OFF as a requested state illustrated in FIG. 31. The image analyzing unit 16 then causes the EL lighting timing generation circuit 18 to generate the lighting request signals ELreq1 and ELreq2. The first electrode control unit 141 controls the Tx timing synthesis circuit 19 based on the control signal supplied from the control unit 11.

When the input device 2 performs a proximity detection operation, the first electrode driver 14 illustrated in FIG. 1 performs driving to sequentially and time-divisionally scan the drive electrodes Tx illustrated in FIG. 7. As a result, a part of the first conductive layers 31 is sequentially selected as the drive electrodes Tx. The input device 2 then outputs the proximity detection signals Vdet from the third conductive layers 33 (proximity detection electrodes Rx) in response to application of the drive signal pulses Sg. The first electrode driver 14 may perform driving to sequentially and time-divisionally scan detection blocks each including a plurality of drive electrodes Tx illustrated in FIG. 7 in the input device 2.

As illustrated in FIG. 32, the first electrode driver 14 applies the drive signal pulse Sg to a part of the first conductive layers 31 serving as the drive electrodes Tx in the drive selection period Htx. As illustrated in FIG. 32, the second electrode driver 15 applies the voltage Vk to the second conductive layer 32 at about the same level as that of high potential (H-level) of the drive signal pulse Sg of the voltage Va applied to the first conductive layer 31. The voltage Vk applied to the second conductive layer 32 is a voltage applied in a reverse-bias direction for the light-emitting element unit DEL with respect to low potential (L-level) of the drive signal pulse Sg.

The relation between the voltage Va applied to the first conductive layer 31 and the voltage Vk applied to the second conductive layer 32 is the same voltage or voltages in the reverse-bias direction. As a result, light emitted from the light-emitting element unit DEL is turned off or reduced (hereinafter, referred to as "turned off"). Consequently, the voltage Vk applied to the second conductive layer 32 illustrated in FIG. 32 is a lighting non-selective voltage applied not to select lighting of the light-emitting element unit DEL. When the voltage Vk illustrated in FIG. 32 is applied to the second conductive layer 32, the light-emitting element unit DEL is turned off regardless of application of the drive signal pulse Sg. The same voltage herein described simply needs to indicate that the voltage difference between the voltage Va applied to the first conductive layer 31 and the voltage Vk applied to the second conductive layer 32 is smaller than the forward-bias light-emitting drive voltage ΔVFL for the light-emitting element unit DEL.

As illustrated in FIG. 33, the first electrode driver 14 applies the drive signal pulse Sg to a part of the first conductive layers 31 serving as the drive electrodes Tx in the drive selection period Htx. As illustrated in FIG. 33, the second electrode driver 15 applies the voltage Vk to the second conductive layer 32 at a voltage difference of equal to or higher than the forward-bias light-emitting drive voltage ΔVFL for the light-emitting element unit DEL with respect to the high potential (H-level) of the drive signal pulse Sg of the voltage Va applied to the first conductive layer 31. The voltage Vk applied to the second conductive layer 32 is a voltage applied in a reverse-bias direction for the light-emitting element unit DEL with respect to the low potential (L-level) of the drive signal pulse Sg. As a result, the light-emitting element unit DEL is turned on only in the drive selection period Htx during which the drive signal pulse Sg is applied to the first conductive layer 31. Consequently, the voltage Vk applied to the second conductive layer 32 illustrated in FIG. 33 is a lighting selective voltage applied to select lighting of the light-emitting element unit DEL. When the low potential (L-level) of the drive signal pulse Sg is applied to the first conductive layer 31, the light-emitting element unit DEL is turned off.

As illustrated in FIG. 33, the voltage Vk applied to the second conductive layer 32 is higher than the low potential (L-level) of the drive signal pulse Sg. The voltage Vk applied to the second conductive layer 32 needs to be a reverse-bias voltage for the light-emitting element unit DEL with respect to the low potential (L-level) of the drive signal pulse Sg. If the voltage Vk applied to the second conductive layer 32 is lower than the low potential (L-level) of the drive signal pulse Sg, a forward-bias voltage difference for the light-emitting element unit DEL is applied, thereby turning on the light-emitting element unit DEL regardless of application of the drive signal pulse Sg. As a result, the non-lighting state L-OFF illustrated in FIG. 31 fails to be created.

FIGS. 32 and 33 illustrate a state of voltage application to the light-emitting element units DEL present at the intersections in planar view of the first conductive layers 31 serving as the drive electrodes Tx1 to Txn and the second conductive layers 32 serving as the drive electrodes Ty1 to Typ as illustrated in FIG. 12. The light-emitting element units DEL illustrated in FIG. 31 are coupled, in a matrix form, to the drive electrodes Tx1 to Tx3 among the drive electrodes Tx1 to Txn in FIG. 12 and the drive electrodes Ty1 to Ty3 among the drive electrodes Ty1 to Typ in FIG. 12.

As illustrated in FIG. 12, the control unit 11 causes the EL lighting timing generation circuit 18 to generate the lighting request signals ELreq1 and ELreq2 based on the lighting amount information AEL requested by the image analyzing unit 16. The EL lighting timing generation circuit 18 generates a voltage difference between the lighting request signal ELreq1 and the lighting request signal ELreq2 so as to correspond to the lighting amount of each light-emitting element unit DEL. To apply the lighting non-selective voltage illustrated in FIG. 32 in response to the lighting request signal ELreq1, the second electrode driver 15 applies a high-potential voltage to the drive electrodes Ty1 to Ty3 as illustrated in FIG. 34. On the other hand, to apply the lighting selective voltage illustrated in FIG. 33 in response to the lighting request signal ELreq1, the second electrode driver 15 applies a low-potential voltage to the drive electrodes Ty1 to Ty3 as illustrated in FIG. 34. The application of the low-potential voltage corresponds to the lighting pulse Sel.

The timing chart in FIG. 34 illustrates a first period H1 in which a second period (lighting request period) H2 does not coincide with a third period (proximity detection period) H3. In the second period H2, any one of the light-emitting element units DEL is turned on. The third period H3 includes the drive selection period Htx during which the drive signal pulse Sg is applied.

In the second period H2 illustrated in FIG. 34, the first electrode driver 14 supplies the amplified drive signal pulse Sg to the drive electrodes Tx1 to Tx3 (a part of the first conductive layers 31) of the input device 2 sequentially selected in the scanning direction Scan based on the lighting request signal ELreq2. The second electrode driver 15 generates the lighting pulse Sel based on the lighting request signal ELreq1, and supplies the lighting pulse Sel to any selected electrode of the electrodes Ty1 to Ty3 of the second conductive layers 32 in a drive selection period Hty.

As illustrated in FIG. 34, the first electrode driver 14 applies the drive signal pulse Sg in the drive selection period Htx. Because the light-emitting element units DEL are coupled to the drive electrodes Tx1 to Tx3 and the drive electrodes Ty1 to Ty3 in a matrix form, only the light-emitting element units DEL to which the drive signal pulse Sg and the lighting pulse Sel are simultaneously applied are made into the lighting state L-ON.

As illustrated in FIGS. 31 and 34, at the light-emitting element unit DEL present at the intersection of the drive electrode Tx1 and the drive electrode Ty1, the drive signal pulse Sg in the drive selection period Htx coincides with the lighting pulse Sel in the drive selection period Hty. As a result, these pulses are simultaneously applied to the light-emitting element unit DEL. Because a voltage of equal to or higher than the forward-bias light-emitting drive voltage ΔVFL is applied to the light-emitting element unit DEL to which the drive signal pulse Sg and the lighting pulse Sel are simultaneously applied, the light-emitting element unit DEL is made into the lighting state L-ON.

As illustrated in FIGS. 31 and 34, at the light-emitting element unit DEL present at the intersection of the drive electrode Tx1 and the drive electrode Ty2, the drive signal pulse Sg in the drive selection period Htx does not coincide with the lighting pulse Sel in the drive selection period Hty. As a result, these pulses are not applied simultaneously to the light-emitting element unit DEL. Because a reverse-bias voltage is applied to the light-emitting element unit DEL to which only the drive signal pulse Sg is applied, the light-emitting element unit DEL is made into the non-lighting state L-OFF.

As illustrated in FIGS. 31 and 34, at the light-emitting element unit DEL present at the intersection of the drive electrode Tx1 and the drive electrode Ty3, the drive signal pulse Sg in the drive selection period Htx coincides with the lighting pulse Sel in the drive selection period Hty. As a result, these pulses are simultaneously applied to the light-emitting element unit DEL. Because a voltage of equal to or higher than the forward-bias light-emitting drive voltage ΔVFL is applied to the light-emitting element unit DEL to which the drive signal pulse Sg and the lighting pulse Sel are simultaneously applied, the light-emitting element unit DEL is made into the lighting state L-ON.

As illustrated in FIGS. 31 and 34, at the light-emitting element unit DEL present at the intersection of the drive electrode Tx2 and the drive electrode Ty1, the drive signal pulse Sg in the drive selection period Htx does not coincide with the lighting pulse Sel in the drive selection period Hty. As a result, these pulses are not applied simultaneously to the light-emitting element unit DEL. Because a reverse-bias voltage is applied to the light-emitting element unit DEL to which only the drive signal pulse Sg is applied, the light-emitting element unit DEL is made into the non-lighting state L-OFF.

As illustrated in FIGS. 31 and 34, at the light-emitting element unit DEL present at the intersection of the drive electrode Tx2 and the drive electrode Ty2, the drive signal pulse Sg in the drive selection period Htx coincides with the lighting pulse Sel in the drive selection period Hty. As a result, these pulses are simultaneously applied to the light-emitting element unit DEL. Because a voltage of equal to or higher than the forward-bias light-emitting drive voltage ΔVFL is applied to the light-emitting element unit DEL to which the drive signal pulse Sg and the lighting pulse Sel are simultaneously applied, the light-emitting element unit DEL is made into the lighting state L-ON.

The drive signal pulse Sg in the drive selection period Htx and the lighting pulse Sel in the drive selection period Hty are simultaneously applied to the light-emitting element unit DEL present at the intersection of the drive electrode Tx2 and the drive electrode Ty3. Because a voltage of equal to or higher than the forward-bias light-emitting drive voltage ΔVFL is applied to the light-emitting element unit DEL to which the drive signal pulse Sg and the lighting pulse Sel are simultaneously applied, the light-emitting element unit DEL is made into the lighting state L-ON.

As illustrated in FIGS. 31 and 34, at the light-emitting element unit DEL present at the intersection of the drive electrode Tx3 and the drive electrode Ty1, the drive signal pulse Sg in the drive selection period Htx does not coincide with the lighting pulse Sel in the drive selection period Hty. As a result, these pulses are not applied simultaneously to the light-emitting element unit DEL. Because a reverse-bias voltage is applied to the light-emitting element unit DEL to which only the drive signal pulse Sg is applied, the light-emitting element unit DEL is made into the non-lighting state L-OFF.

As illustrated in FIGS. 31 and 34, at the light-emitting element unit DEL present at the intersection of the drive electrode Tx3 and the drive electrode Ty2, the drive signal pulse Sg in the drive selection period Htx coincides with the lighting pulse Sel in the drive selection period Hty. As a result, these pulses are simultaneously applied to the light-emitting element unit DEL. Because a voltage of equal to or higher than the forward-bias light-emitting drive voltage ΔVFL is applied to the light-emitting element unit DEL to which the drive signal pulse Sg and the lighting pulse Sel are simultaneously applied, the light-emitting element unit DEL is made into the lighting state L-ON.

As illustrated in FIGS. 31 and 34, at the light-emitting element unit DEL present at the intersection of the drive electrode Tx3 and the drive electrode Ty3, the drive signal pulse Sg in the drive selection period Htx does not coincide with the lighting pulse Sel in the drive selection period Hty. As a result, these pulses are not applied simultaneously to the light-emitting element unit DEL. Because a reverse-bias voltage is applied to the light-emitting element unit DEL to which only the drive signal pulse Sg is applied, the light-emitting element unit DEL is made into the non-lighting state L-OFF.

As described above, in the second period H2 illustrated in FIG. 34, the first electrode driver 14 and the second electrode driver 15 according to the fourth embodiment can perform control such that the light-emitting element units DEL are individually made into the lighting state L-ON or the non-lighting state L-OFF as illustrated in FIG. 31. In the second period H2, the proximity detecting unit 40 does not detect the drive signal pulse Sg or does not handle a period in which the drive signal pulse Sg is detected as the drive selection period Htx.

In the second period H2 illustrated in FIG. 34, the voltage difference in the individual lighting pulse Sel does not exceed the forward-bias light-emitting drive voltage ΔVFL. This configuration makes it possible to individually make the light-emitting element units DEL into the lighting state L-ON or the non-lighting state L-OFF.

In the third period H3 illustrated in FIG. 34, a reverse-bias voltage is applied to the light-emitting element unit DEL to which only the drive signal pulse Sg is applied. As a result, the light-emitting element unit DEL is made into the non-lighting state L-OFF. Because a high-potential voltage is applied to the drive electrodes Ty1 to Ty3 as described above, the light-emitting element unit DEL is made into the same state as the state where the voltage Vk is applied to the second conductive layer 32 illustrated in FIG. 32. As a result, the light-emitting element unit DEL is turned off regardless of application of the drive signal pulse Sg. The proximity detecting unit 40 detects a voltage difference between the proximity detection signals Vdet at at least one timing of rising-up and falling-down of the drive signal pulse Sg. The input device 2 can thus detect proximity of the external proximity object.

Figure 35:
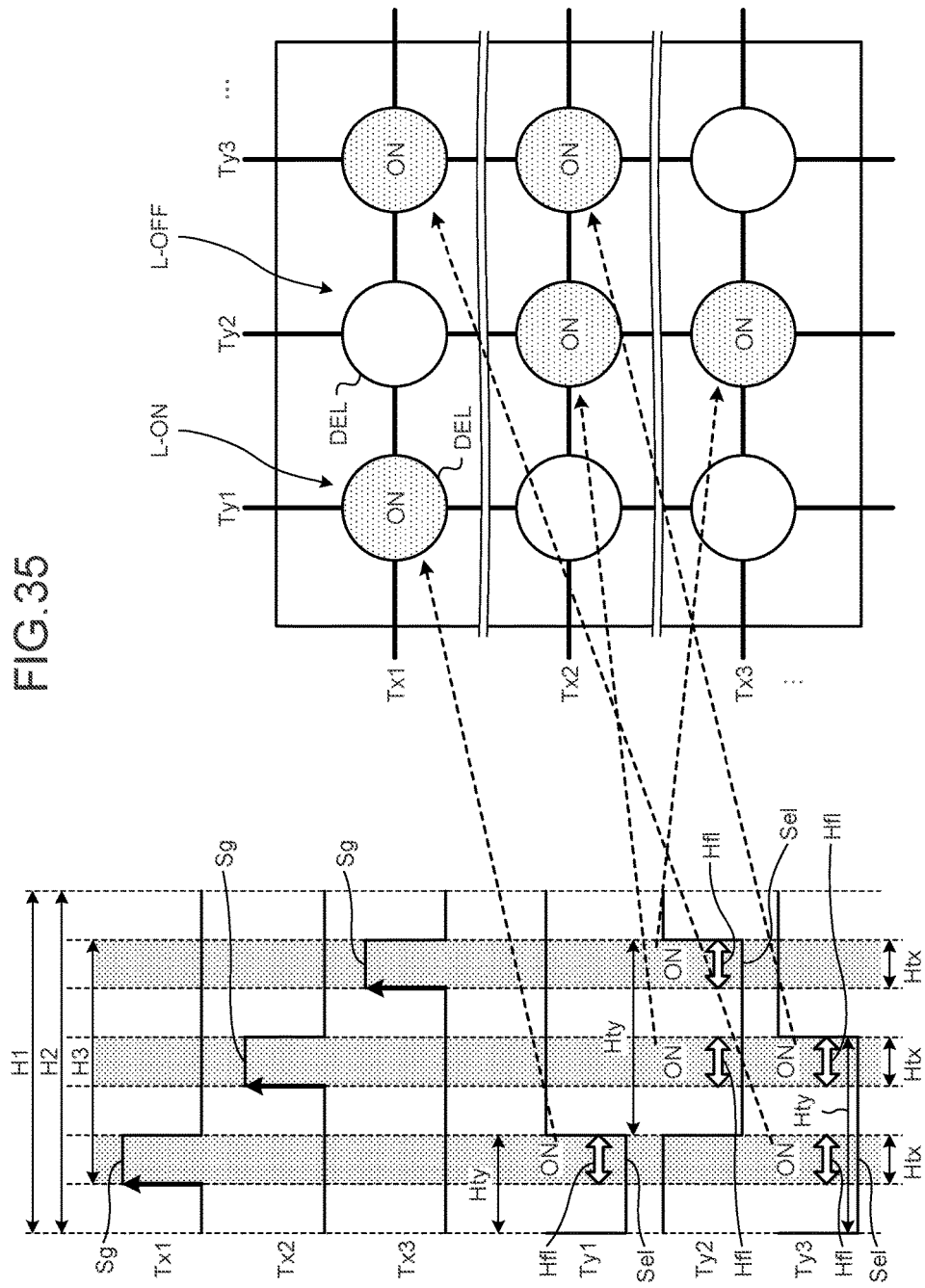
FIG. 35 is a timing chart illustrating a case where the lighting request period coincides with the proximity detection period in the drive control according to the fourth embodiment.

FIG. 35 is a timing chart illustrating a case where the lighting request period coincides with the proximity detection period in the drive control according to the fourth embodiment. The timing chart in FIG. 35 illustrates the first period H1 in which the second period (lighting request period) H2 coincides with the third period (proximity detection period) H3. In the second period H2, any one of the light-emitting element units DEL is turned on. The third period H3 includes the drive selection period Htx during which the drive signal pulse Sg is applied.

As illustrated in FIG. 35, at the light-emitting element unit DEL present at the intersection of the drive electrode Tx1 and the drive electrode Ty1, the drive signal pulse Sg in the drive selection period Htx coincides with the lighting pulse Sel in the drive selection period Hty. As a result, these pulses are simultaneously applied to the light-emitting element unit DEL. Because a voltage of equal to or higher than the forward-bias light-emitting drive voltage ΔVFL is applied to the light-emitting element unit DEL to which the drive signal pulse Sg and the lighting pulse Sel are simultaneously applied, the light-emitting element unit DEL is made into the lighting state L-ON. The period in which the drive signal pulse Sg in the drive selection period Htx coincides with the lighting pulse Sel in the drive selection period Hty corresponds to the lighting period Hfl. In the lighting period Hfl, the light-emitting element unit DEL present at the intersection of the drive electrode Tx1 and the drive electrode Ty1 is made into the lighting state L-ON. At this time, the proximity detecting unit 40 detects a voltage difference at timing of rising-up of the drive signal pulse Sg indicated by the arrow. The input device 2 can thus detect proximity of the external proximity object.

As illustrated in FIG. 35, the first electrode driver 14 can supply the drive signal pulse Sg at constant timing regardless of whether the light-emitting element unit DEL is turned on or off. As a result, the accuracy of proximity detection performed by the input device 2 does not vary depending on whether the light-emitting element unit DEL is turned on or off.

As illustrated in FIG. 35, at the light-emitting element unit DEL present at the intersection of the drive electrode Tx1 and the drive electrode Ty2, the drive signal pulse Sg in the drive selection period Htx does not coincide with the lighting pulse Sel in the drive selection period Hty. As a result, these pulses are not applied simultaneously to the light-emitting element unit DEL. Because a reverse-bias voltage is applied to the light-emitting element unit DEL to which only the drive signal pulse Sg is applied, the light-emitting element unit DEL is made into the non-lighting state L-OFF.

As illustrated in FIG. 35, at the light-emitting element unit DEL present at the intersection of the drive electrode Tx1 and the drive electrode Ty3, the drive signal pulse Sg in the drive selection period Htx coincides with the lighting pulse Sel in the drive selection period Hty. As a result, these pulses are simultaneously applied to the light-emitting element unit DEL. Because a voltage of equal to or higher than the forward-bias light-emitting drive voltage $\Delta VFL$ is applied to the light-emitting element unit DEL to which the drive signal pulse Sg and the lighting pulse Sel are simultaneously applied, the light-emitting element unit DEL is made into the lighting state L-ON.

As illustrated in FIG. 35, at the light-emitting element unit DEL present at the intersection of the drive electrode Tx2 and the drive electrode Ty1, the drive signal pulse Sg in the drive selection period Htx does not coincide with the lighting pulse Sel in the drive selection period Hty. As a result, these pulses are not applied simultaneously to the light-emitting element unit DEL. Because a reverse-bias voltage is applied to the light-emitting element unit DEL to which only the drive signal pulse Sg is applied, the light-emitting element unit DEL is made into the non-lighting state L-OFF.

As illustrated in FIG. 35, the drive signal pulse Sg and the lighting pulse Sel are simultaneously applied to the light-emitting element unit DEL present at the intersection of the drive electrode Tx2 and the drive electrode Ty2 in the lighting period Hfl in which the drive signal pulse Sg in the drive selection period Htx coincides with the lighting pulse Sel in the drive selection period Hty. Because a voltage of equal to or higher than the forward-bias light-emitting drive voltage $\Delta VFL$ is applied to the light-emitting element unit DEL to which the drive signal pulse Sg and the lighting pulse Sel are simultaneously applied, the light-emitting element unit DEL is made into the lighting state L-ON. At this time, the proximity detecting unit 40 detects a voltage difference at timing of rising-up of the drive signal pulse Sg indicated by the arrow. The input device 2 can thus detect proximity of the external proximity object.

The drive signal pulse Sg and the lighting pulse Sel are simultaneously applied to the light-emitting element unit DEL present at the intersection of the drive electrode Tx2 and the drive electrode Ty3 in the lighting period Hfl in which the drive signal pulse Sg in the drive selection period Htx coincides with the lighting pulse Sel in the drive selection period Hty. Because a voltage of equal to or higher than the forward-bias light-emitting drive voltage $\Delta VFL$ is applied to the light-emitting element unit DEL to which the drive signal pulse Sg and the lighting pulse Sel, the light-emitting element unit DEL is made into the lighting state L-ON.

As illustrated in FIG. 35, at the light-emitting element unit DEL present at the intersection of the drive electrode Tx3 and the drive electrode Ty1, the drive signal pulse Sg in the drive selection period Htx does not coincide with the lighting pulse Sel in the drive selection period Hty. As a result, these pulses are not applied simultaneously to the light-emitting element unit DEL. Because a reverse-bias voltage is applied to the light-emitting element unit DEL to which only the drive signal pulse Sg is applied, the light-emitting element unit DEL is made into the non-lighting state L-OFF.

As illustrated in FIG. 35, the drive signal pulse Sg and the lighting pulse Sel are simultaneously applied to the light-emitting element unit DEL present at the intersection of the drive electrode Tx3 and the drive electrode Ty2 in the lighting period Hfl in which the drive signal pulse Sg in the drive selection period Htx coincides with the lighting pulse Sel in the drive selection period Hty. Because a voltage of equal to or higher than the forward-bias light-emitting drive voltage $\Delta VFL$ is applied to the light-emitting element unit DEL to which the drive signal pulse Sg and the lighting pulse Sel are simultaneously applied, the light-emitting element unit DEL is made into the lighting state L-ON.

As illustrated in FIG. 35, at the light-emitting element unit DEL present at the intersection of the drive electrode Tx3 and the drive electrode Ty3, the drive signal pulse Sg in the drive selection period Htx does not coincide with the lighting pulse Sel in the drive selection period Hty. As a result, these pulses are not applied simultaneously to the light-emitting element unit DEL. Because a reverse-bias voltage is applied to the light-emitting element unit DEL to which only the drive signal pulse Sg is applied, the light-emitting element unit DEL is made into the non-lighting state L-OFF. At this time, the proximity detecting unit 40 detects a voltage difference at timing of rising-up of the drive signal pulse Sg indicated by the arrow. The input device 2 can thus detect proximity of the external proximity object.

Figure 36:
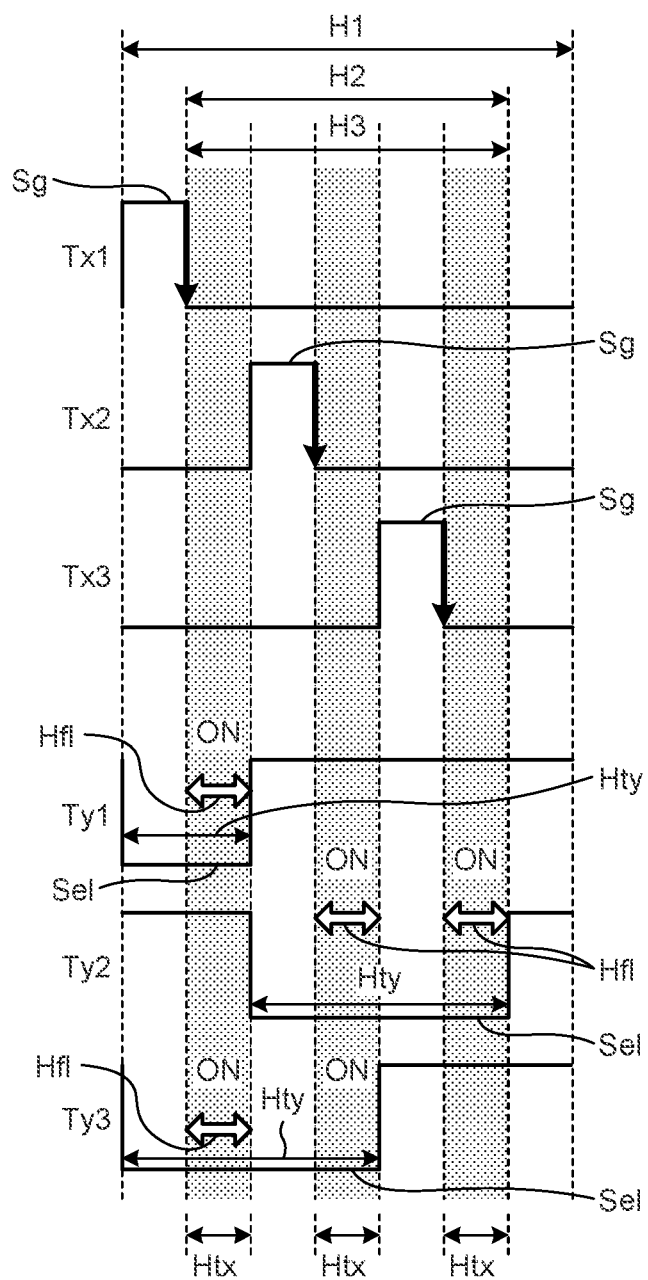
FIG. 36 is another timing chart illustrating a case where the lighting request period coincides with the proximity detection period in the drive control according to the fourth embodiment.

FIG. 36 is another timing chart illustrating a case where the lighting request period coincides with the proximity detection period in the drive control according to the fourth embodiment. As illustrated in FIG. 36, the proximity detecting unit 40 detects a voltage difference at timing of falling-down of the drive signal pulse Sg indicated by the arrow. The input device 2 can thus detect proximity of the external proximity object.

Figure 37:
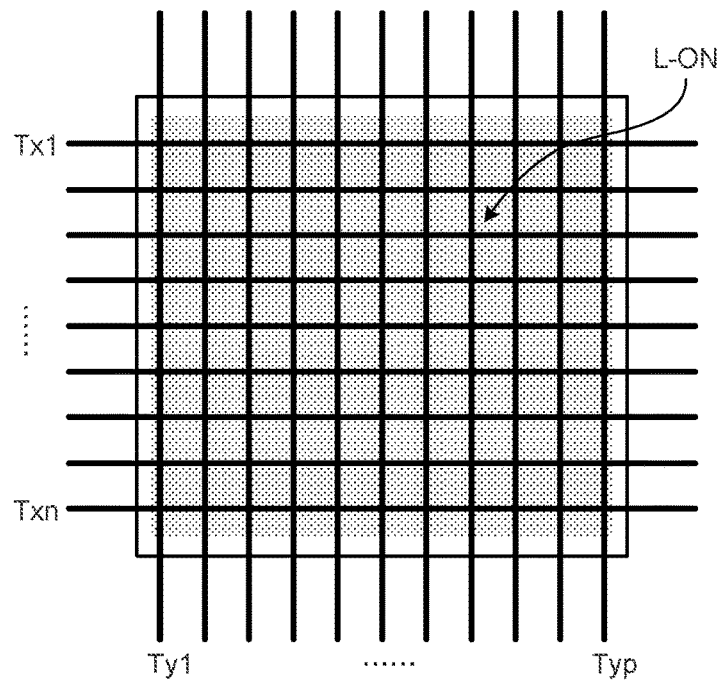
FIG. 37 is a diagram for explaining individual area lighting control performed by the input device according to the fourth embodiment.
Figure 38:
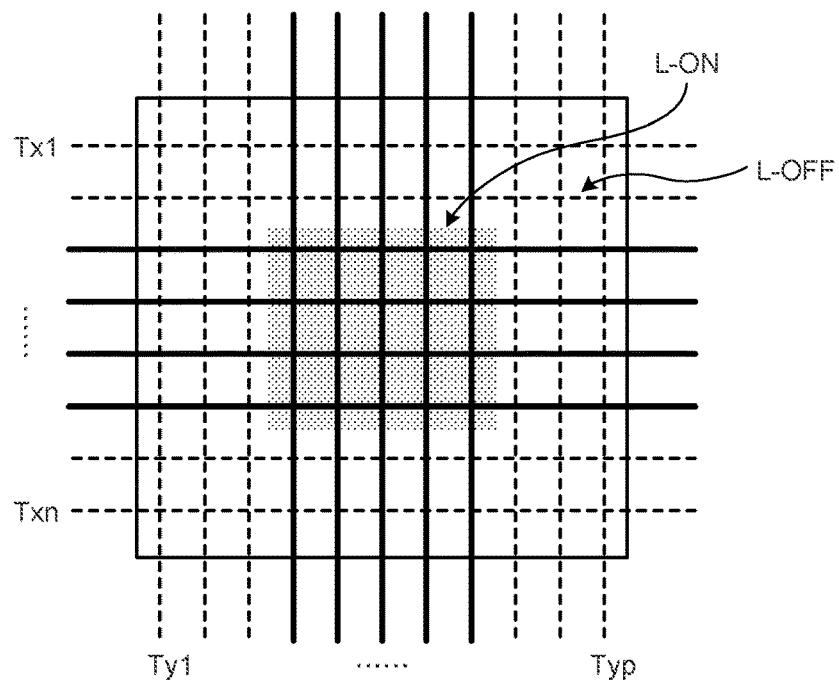
FIG. 38 is another diagram for explaining individual area lighting control performed by the input device according to the fourth embodiment.

FIGS. 37 and 38 are diagrams for explaining individual area lighting control performed by the input device according to the fourth embodiment. As described above, the input device according to the fourth embodiment includes a plurality of light-emitting element units DEL. The input device can perform control such that the light-emitting element units DEL are individually made into the lighting state L-ON or the non-lighting state L-OFF. As illustrated in FIG. 37, the first electrode driver 14 according to the fourth embodiment applies the drive signal pulses Sg to the drive electrodes Tx1 to Txn indicated by the solid lines. At the same time, the second electrode driver 15 according to the fourth embodiment applies the lighting pulses Sel to the electrodes Ty1 to Typ indicated by the solid lines. With this operation, the first electrode driver 14 and the second electrode driver 15 according to the fourth embodiment can cause the input device to serve as a front light with the entire plane thereof made into the lighting state L-ON.

As illustrated in FIG. 38, the first electrode driver 14 according to the fourth embodiment applies the drive signal pulses Sg to a part of the drive electrodes Tx1 to Txn indicated by the solid lines. At the same time, the second electrode driver 15 according to the fourth embodiment applies the lighting pulses Sel to a part of the electrodes Ty1 to Typ indicated by the solid lines. With this operation, the first electrode driver 14 and the second electrode driver 15 according to the fourth embodiment can perform lighting control on individual areas such that a part of the plane is made into the lighting state L-ON and the other part thereof is made into the non-lighting state L-OFF.

The present invention can naturally provide other advantageous effects that are provided by the aspects described in the embodiments above and are clearly defined by the description in the present specification or appropriately conceivable by those skilled in the art.

Aspects of Present Disclosure

The present disclosure includes the following aspects.

(1) An input device comprising:
a first substrate including a first surface and a second surface;
a light-emitting element unit including:
a plurality of first conductive layers formed in one layer on the second surface side, a plurality of second conductive layers formed in one layer on the second surface side different from the layer in which the first conductive layers are formed, and
at least one luminescent layer provided between the first conductive layers and the second conductive layers and electrically in contact with the first conductive layers and the second conductive layers; and
a plurality of third conductive layers that are formed so as to be insulated from the first conductive layers and the second conductive layers and not to intersect with the second conductive layers in planar view, and that are configured to detect a change in an electric field between the first conductive layers and the third conductive layers depending on coordinates of a proximity object present at a position overlapping with the first conductive layers and the first surface in planar view.

(2) The input device according to (1), wherein the third conductive layers continuously extend in one direction in planar view that is the same direction in which the second conductive layers extend in planar view.

(3) The input device according to (1) or (2), wherein the first conductive layers continuously extend in one direction in planar view and intersect with the second conductive layers and the third conductive layers in planar view.

(4) The input device according to any one of (1) to (3), wherein the luminescent layer has a size overlapping with the first conductive layers and the second conductive layers in planar view.

(5) The input device according to (4), wherein the light-emitting element unit is capable of emitting light along a shape of a contact portion at which the luminescent layer is electrically in contact with the second conductive layers.

(6) The input device according to (5), wherein, when an extending direction of the first conductive layers is a first direction, and an extending direction of the second conductive layers is a second direction,
the light-emitting element unit further includes a first light-blocking portion provided closer to the first surface than the luminescent layer, and
the first light-blocking portion is provided in the same layer as the layer in which the second conductive layers are formed, and is formed as a wide portion such that the width of the second conductive layers is broadened in the first direction, and the length of the first light-blocking portion in the first direction is larger than the maximum length of the contract portion in the first direction.

(7) The input device according to any one of (1) to (6), wherein the third conductive layers are formed in the same layer as the layer in which the second conductive layers are formed.

(8) The input device according to (1) or (2), wherein the third conductive layers are formed in the same layer as the layer in which the first conductive layers are formed.

(9) The input device according to (8), wherein
the first conductive layers are laminated on the luminescent layer with an insulation layer interposed therebetween,
a plurality of fourth conductive layers in contact with the first conductive layers are provided at portions where the first conductive layers intersect with the second conductive layers, and
each of the fourth conductive layers is electrically coupled to a part of the luminescent layer via a contact portion.

(10) The input device according to (9), wherein the fourth conductive layers are made of a metal material having metallic luster.

(11) The input device according to (1), (2), (3), or (10), wherein
the first conductive layers are laminated on the luminescent layer with an insulation layer interposed therebetween and are scattered like islands in planar view,
a plurality of fifth conductive layers are provided at portions where the first conductive layers intersect with the third conductive layers,
each of the fifth conductive layers couples ends of adjacent first conductive layers so as to cross over one of the third conductive layers in a manner insulated from the third conductive layer, and the ends are coupled by the fifth conductive layers in a manner extending in a first direction, and
the third conductive layers are laminated on the luminescent layer with the insulation layer interposed therebetween and have a shape continuously extending in a second direction intersecting with the first direction in which the ends are coupled by the fifth conductive layers in planar view.

(12) The input device according to (11), wherein the first conductive layers have an outer shape filling an unoccupied area between adjacent third conductive layers among the third conductive layers in planar view in a manner insulated therefrom.

(13) The input device according to (11) or (12), wherein the first conductive layers and the second conductive layers are made of a light-transmissive conductive material.

(14) The input device according to (9), wherein
the luminescent layer has a protrusion formed such that the area of a section of the contact portion parallel to the second surface decreases as the section comes closer to the second surface, and each of the fourth conductive layers is made of a metal having metallic luster and covers an inclination surface corresponding to a side surface of the protrusion inclined with respect to the second surface.

(15) The input device according to any one of (1) to (3), wherein the luminescent layer has a size overlapping with one of the first conductive layers and one of the second conductive layers in planar view.

(16) The input device according to (15), wherein
the luminescent layer has a plurality of protrusions arranged like islands in planar view and protruding toward the second surface, and
a part of the first conductive layers is coupled to the protrusions of the luminescent layer via the fourth conductive layers.

(17) The input device according to any one of (1) to (16), wherein the luminescent layer is an organic luminescent layer.

(18) The input device according to any one of (1) to (17), the first conductive layers, the second conductive layers, and the third conductive layers are provided on the second surface side of the first substrate.

(19) An input device comprising:
a first substrate including a first surface and a second surface;
a light-emitting element unit including:
a plurality of first conductive layers formed in one layer on the second surface side;
a plurality of second conductive layers formed in one layer on the second surface side different from the layer in which the first conductive layers are formed; and
at least one luminescent layer provided between the first conductive layers and the second conductive layers and electrically in contact with the first conductive layers and the second conductive layers; and
a plurality of third conductive layers that are formed so as to be insulated from the first conductive layers and the second conductive layers and not to intersect with the second conductive layers in planar view, and are configured to detect a change in an electric field between the first conductive layers and the third conductive layers depending on coordinates of a proximity object present at a position overlapping with the first conductive layers and the first surface in planar view, wherein
a drive signal pulse is applied to a part of the first conductive layers, the drive signal pulse rising in a reverse-bias direction opposite to a voltage in a forward-bias direction applied between the first conductive layers and the second conductive layers at which the light-emitting element unit emits light.

(20) The input device according to (19), further comprising
a first electrode driver that supplies a voltage to the first conductive layers;
a second electrode driver that supplies a voltage to the second conductive layers; and
a proximity detecting unit that processes the change in the electric field between the first conductive layers and the third conductive layers depending on the coordinates of the proximity object present at the position overlapping with the first surface of the first substrate in planar view as a proximity detection signal in response to the drive signal pulse, wherein
the first electrode driver time-divisionally scans a part of the first conductive layers as a drive electrode and supplies the drive signal pulse to the scanned part of the first conductive layers.

(21) The input device according to (19) or (20), further comprising:
a first electrode driver that supplies a voltage to the first conductive layers;
a second electrode driver that supplies a voltage to the second conductive layers; and
a proximity detecting unit that processes the change in the electric field between the first conductive layers and the third conductive layers depending on the coordinates of the proximity object present at the position overlapping with the first surface of the first substrate in planar view as a proximity detection signal in response to the drive signal pulse, wherein
the second electrode driver applies the voltage in the forward-bias direction between the first conductive layers and the second conductive layers and causes the light-emitting element unit to emit light.

(22) The input device according to (19) or (20), further comprising:
a first electrode driver that supplies a voltage to the first conductive layers;
a second electrode driver that supplies a voltage to the second conductive layers; and
a proximity detecting unit that processes the change in the electric field between the first conductive layers and the third conductive layers depending on the coordinates of the proximity object present at the position overlapping with the first surface of the first substrate in planar view as a proximity detection signal in response to the drive signal pulse, wherein
the second electrode driver applies a lighting pulse rising in the forward-bias direction and causes the light-emitting element unit to emit light in response to the lighting pulse applied simultaneously with the drive signal pulse.

(23) A display device comprising:
an input device that comprises:
a first substrate including a first surface and a second surface;
a light-emitting element unit including:
a plurality of first conductive layers formed in one layer on the second surface side;
a plurality of second conductive layers formed in one layer on the second surface side different from the layer in which the first conductive layers are formed; and
at least one luminescent layer provided between the first conductive layers and the second conductive layers and electrically in contact with the first conductive layers and the second conductive layers; and
a plurality of third conductive layers that are formed so as to be insulated from the first conductive layers and the second conductive layers and not to intersect with the second conductive layers in planar view, and are configured to detect a change in an electric field between the first conductive layers and the third conductive layers depending on coordinates of a proximity object present at a position overlapping with the first conductive layers and the first surface in planar view; and
a display unit provided on the second surface side of the input device and capable of displaying an image on the first surface side.

What is claimed is:
1. An input device comprising:
a first substrate including a first surface and a second surface;
a light-emitting element unit including:

a plurality of first conductive layers made of a transparent light-transmissive conductive material, and formed in one layer on the second surface side;
a plurality of second conductive layers formed in one layer on the second surface side different from the layer in which the first conductive layers are formed; and
at least one luminescent layer provided between the first conductive layers and the second conductive layers and electrically in contact with the first conductive layers and the second conductive layers; and
a plurality of third conductive layers that are formed so as to be insulated from the first conductive layers and the second conductive layers and not to intersect with the second conductive layers in planar view, and that are configured to detect a change in an electric field between the first conductive layers and the third conductive layers depending on coordinates of a proximity object present at a position overlapping with the first conductive layers and the first surface in planar view,
wherein the at least one luminescent layer emits light via the first conductive layers in a direction facing away from the second surface of the first substrate.

2. The input device according to claim 1, wherein the luminescent layer has a size overlapping with the first conductive layers and the second conductive layers in planar view.

3. The input device according to claim 2, wherein the light-emitting element unit is capable of emitting light along a shape of a contact portion at which the luminescent layer is electrically in contact with the second conductive layers.

4. The input device according to claim 3, wherein, when an extending direction of the first conductive layers is a first direction, and an extending direction of the second conductive layers is a second direction,
the light-emitting element unit further includes a first light-blocking portion provided closer to the first surface than the luminescent layer, and
the first light-blocking portion is provided in the same layer as the layer in which the second conductive layers are formed, and is formed as a wide portion such that the width of the second conductive layers is broadened in the first direction, and the length of the first light-blocking portion in the first direction is larger than the maximum length of the contract portion in the first direction.

5. The input device according to claim 1, wherein the third conductive layers are formed in the same layer as the layer in which the second conductive layers are formed.

6. The input device according to claim 1, wherein the third conductive layers are formed in the same layer as the layer in which the first conductive layers are formed.

7. The input device according to claim 6, wherein
the first conductive layers are laminated on the luminescent layer with an insulation layer interposed therebetween, and
a plurality of fourth conductive layers in contact with the first conductive layers are provided at portions where the first conductive layers intersect with the second conductive layers, and
each of the fourth conductive layers is electrically coupled to a part of the luminescent layer via a contact portion.

8. The input device according to claim 1, wherein
the first conductive layers are laminated on the luminescent layer with an insulation layer interposed therebetween and are scattered like islands in planar view, a plurality of fifth conductive layers are provided at portions where the first conductive layers intersect with the third conductive layers,
each of the fifth conductive layers couples ends of adjacent first conductive layers so as to cross over one of the third conductive layers in a manner insulated from the third conductive layer, and the ends are coupled by the fifth conductive layers in a manner extending in a first direction, and
the third conductive layers are laminated on the luminescent layer with the insulation layer interposed therebetween and have a shape continuously extending in a second direction intersecting with the first direction in which the ends are coupled by the fifth conductive layers in planar view.

9. The input device according to claim 8, wherein the first conductive layers have an outer shape filling an unoccupied area between adjacent third conductive layers among the third conductive layers in planar view in a manner insulated therefrom.

10. The input device according to claim 7, wherein
the luminescent layer has a protrusion formed such that the area of a section of the contact portion parallel to the second surface decreases as the section comes closer to the second surface, and
each of the fourth conductive layers is made of a metal having metallic luster and covers an inclination surface corresponding to a side surface of the protrusion inclined with respect to the second surface.

11. The input device according to claim 1, wherein the luminescent layer has a size overlapping with one of the first conductive layers and one of the second conductive layers in planar view.

12. The input device according to claim 11, wherein
the luminescent layer has a plurality of protrusions arranged like islands in planar view and protruding toward the second surface, and
a part of the first conductive layers is coupled to the protrusions of the luminescent layer via the fourth conductive layers.

13. The input device according to claim 1, wherein the luminescent layer is an organic luminescent layer.

14. The input device according to claim 1, wherein a drive signal pulse is applied to a part of the first conductive layers, the drive signal pulse rising in a reverse-bias direction opposite to a voltage in a forward-bias direction applied between the first conductive layers and the second conductive layers at which the light-emitting element unit emits light.

15. The input device according to claim 14, further comprising:
a first electrode driver that supplies a voltage to the first conductive layers;
a second electrode driver that supplies a voltage to the second conductive layers; and
a proximity detecting unit that processes the change in the electric field between the first conductive layers and the third conductive layers depending on the coordinates of the proximity object present at the position overlapping with the first surface of the first substrate in planar view as a proximity detection signal in response to the drive signal pulse, wherein
the first electrode driver time-divisionally scans a part of the first conductive layers as a drive electrode and supplies the drive signal pulse to the scanned part of the first conductive layers.

16. The input device according to claim 14, further comprising:
- a first electrode driver that supplies a voltage to the first conductive layers;
- a second electrode driver that supplies a voltage to the second conductive layers; and
- a proximity detecting unit that processes the change in the electric field between the first conductive layers and the third conductive layers depending on the coordinates of the proximity object present at the position overlapping with the first surface of the first substrate in planar view as a proximity detection signal in response to the drive signal pulse, wherein
- the second electrode driver applies the voltage in the forward-bias direction between the first conductive layers and the second conductive layers and causes the light-emitting element unit to emit light.

17. The input device according to claim 14, further comprising:
- a first electrode driver that supplies a voltage to the first conductive layers;
- a second electrode driver that supplies a voltage to the second conductive layers; and
- a proximity detecting unit that processes the change in the electric field between the first conductive layers and the third conductive layers depending on the coordinates of the proximity object present at the position overlapping with the first surface of the first substrate in planar view as a proximity detection signal in response to the drive signal pulse, wherein
- the second electrode driver applies a lighting pulse rising in the forward-bias direction and causes the light-emitting element unit to emit light in response to the lighting pulse applied simultaneously with the drive signal pulse.

18. A display device comprising:
an input device that comprises:
- a first substrate including a first surface and a second surface;
- a light-emitting element unit including:
  - a plurality of first conductive layers made of a transparent light-transmissive conductive material, and formed in one layer on the second surface side;
  - a plurality of second conductive layers formed in one layer on the second surface side different from the layer in which the first conductive layers are formed; and
  - at least one luminescent layer provided between the first conductive layers and the second conductive layers and electrically in contact with the first conductive layers and the second conductive layers; and
- a plurality of third conductive layers that are formed so as to be insulated from the first conductive layers and the second conductive layers and not to intersect with the second conductive layers in planar view, and are configured to detect a change in an electric field between the first conductive layers and the third conductive layers depending on coordinates of a proximity object present at a position overlapping with the first conductive layers and the first surface in planar view; and
- a display unit provided on the second surface side of the input device and capable of displaying an image on the first surface side,
wherein the at least one luminescent layer emits light via the first conductive layers in a direction facing away from the second surface of the first substrate.

* * * * *